United States Patent
Gfeller et al.

(10) Patent No.: US 12,361,964 B2
(45) Date of Patent: Jul. 15, 2025

(54) CONDITIONED SEPARATION OF ARBITRARY SOUNDS BASED ON MACHINE LEARNING MODELS

(71) Applicant: Google LLC, Mountain View, CA (US)

(72) Inventors: Beat Gfeller, Duebendorf (CH); Kevin Ian Kilgour, Zurich (CH); Marco Tagliasacchi, Kilchberg (CH); Aren Jansen, Mountain View, CA (US); Scott Thomas Wisdom, Boston, MA (US); Qingqing Huang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 417 days.

(21) Appl. No.: 17/808,653

(22) Filed: Jun. 24, 2022

(65) Prior Publication Data

US 2023/0419989 A1    Dec. 28, 2023

(51) Int. Cl.
| | | |
|---|---|---|
| *G10L 25/84* | (2013.01) | |
| *G10L 15/06* | (2013.01) | |
| *G10L 15/16* | (2006.01) | |
| *G10L 25/30* | (2013.01) | |

(52) U.S. Cl.
CPC ............ *G10L 25/84* (2013.01); *G10L 15/063* (2013.01); *G10L 15/16* (2013.01); *G10L 25/30* (2013.01)

(58) Field of Classification Search
None
See application file for complete search history.

(56) References Cited

U.S. PATENT DOCUMENTS 12,087,320 B1 *   9/2024   Zhang .................... G10L 15/22

OTHER PUBLICATIONS

Elizalde et al. "Cross Modal Audio Search and Retrieval With Joint Embeddings Based on Text and Audio", IEEE, 2019 (Year: 2019).*
Gfeller et al. "One-Shot Conditional Audio Filtering of Arbitrary Sounds", ICASSP IEEE, May 13, 2021 (Year: 2021).*
Jansen, et al. "Unsupervised Learning of Semantic Audio Representations", IEEE, 2018 (Year: 2018).*
Verron et al. "A 3-D Immersive Synthesizer for Environmental Sounds", IEEE, 2010 (Year: 2010).*

(Continued)

*Primary Examiner* — Nicole A K Schmieder
(74) *Attorney, Agent, or Firm* — McDonnell Boehnen & Berghoff LLP

(57) ABSTRACT

Example methods include receiving training data comprising a plurality of audio clips and a plurality of textual descriptions of audio. The methods include generating a shared representation comprising a joint embedding. An audio embedding of a given audio clip is within a threshold distance of a text embedding of a textual description of the given audio clip. The methods include generating, based on the joint embedding, a conditioning vector and training, based on the conditioning vector, a neural network to: receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

23 Claims, 12 Drawing Sheets

Training Phase

(56) References Cited

OTHER PUBLICATIONS

Erdogan et al. "Investigations on Data Augmentation and Loss Functions for Deep Learning Based Speech-Background Separation", Interspeech, 2018 (Year: 2018).*

Karamatli et al. "Audio Source Separation Using Variational Autoencoders and Weak Class Supervision", IEEE, 2019 (Year: 2019).*

Gao et al. "VisualVoice: Audio-Visual Speech Separation with Cross-Modal Consistency", IEEE/CVF, 2021 (Year: 2021).*

Srinivasan et al. "Optimization of Image Embeddings for Few Shot Learning", arXiv:2004.02034v1, 2020 (Year: 2020).*

Akbari et al., "VATT: Transformers for Multimodal Self-Supervised Learning from Raw Video, Audio and Text", 35th Conference on Neural Information Processing Systems (NeurIPS 2021), Sydney, Australia, arXiv:2014.11178v3 [cs.CV] Dec. 7, 2021.

Kilgour et al., "Text-Driven Separation of Arbitrary Sounds", arXiv:2204.05738v1 [eess.AS] Apr. 12, 2022.

Le Magoarou et al., "Text-informed audio source separation. Example-based approach using non-negative matrix partial co-factorization", Journal of Signal Processing Systems, Springer, 2014, pp. 13 hal-01010602.

Schulze-Forster et al., "Phoneme Level Lyrics Alignment and Text-Informed Singing Voice Separation", IEEE/ACM Transactions on Audio, Speech and Language Processing (2021).

Wu et al., "WAV2CLIP: Learning Robust Audio Representations from Clip", arXiv:2110.11499v2 [cs.SD] Feb. 15, 2022.

\* cited by examiner

Training Phase

|  | C1 | C2 Clotho enhanced | | C3 Clotho suppressed | | C4 Audiocaps enhanced | | C5 Audiocaps suppressed | |
| --- | --- | --- | --- | --- | --- | --- | --- | --- | --- |
|  |  | audio | text | audio | text | audio | text | audio | text |
| R1 | SoundFilter | 10.1±0.1 | 9.1±0.1 | 10.1±0.1 | 9.0±0.1 | 8.2±0.1 | 6.5±0.1 | 8.1±0.1 | 6.3±0.1 |
| R2 | consistency loss | 9.5±0.2 | 8.3±0.6 | 9.4±0.2 | 8.3±0.6 | 7.9±0.2 | 6.8±0.2 | 7.8±0.2 | 6.6±0.2 |
| R3 | suppressed audio output | 9.0±0.1 | 6.9±0.2 | - | - | 7.8±0.2 | 6.6±0.1 | - | - |
| R4 | No shared embedding | 9.9±0.1 | - | 9.9±0.1 | - | 8.4±0.1 | - | 8.4±0.1 | - |

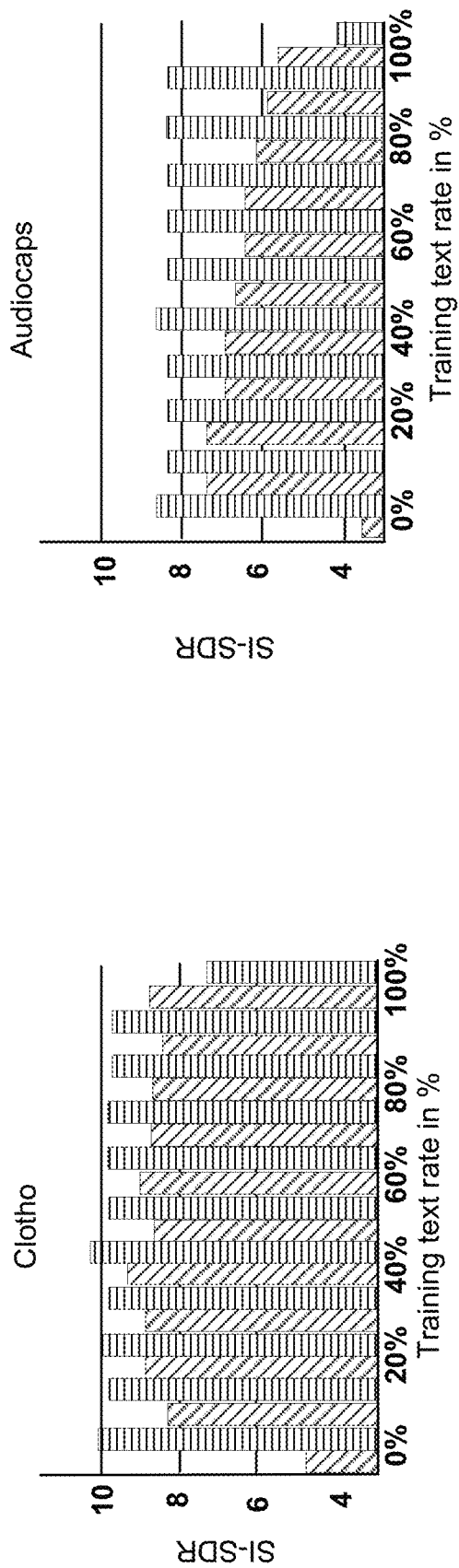
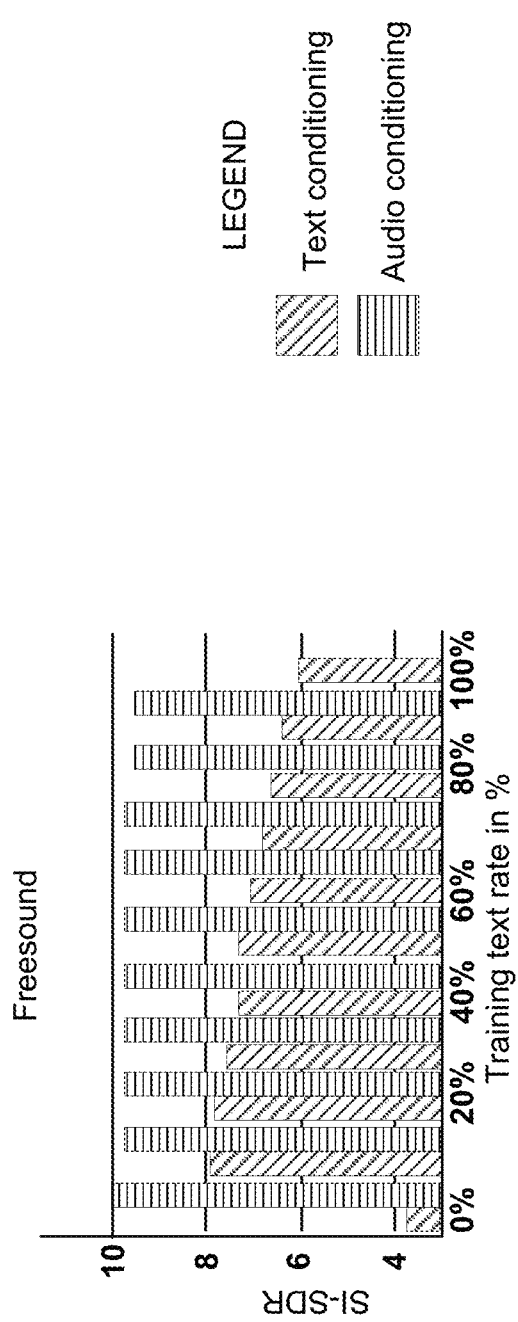
FIG. 5A
FIG. 5B
FIG. 5C

```
                                                                    ┌─1000
┌─────────────────────────────────────────────────────────────────────┐
│ 1010 Receiving, by a computing device, training data comprising a plurality of │
│ audio clips and a plurality of textual descriptions of audio        │
└─────────────────────────────────────────────────────────────────────┘
                                    │
                                    ▼
┌─────────────────────────────────────────────────────────────────────┐
│ 1020 Generating a shared representation comprising a joint embedding, │
│ wherein an audio embedding of a given audio clip of the plurality of audio clips │
│ is within a threshold distance of a text embedding of a textual description of the │
│ given audio clip                                                    │
└─────────────────────────────────────────────────────────────────────┘
                                    │
                                    ▼
┌─────────────────────────────────────────────────────────────────────┐
│ 1030 Generating, based on the joint embedding, a conditioning vector │
└─────────────────────────────────────────────────────────────────────┘
                                    │
                                    ▼
┌─────────────────────────────────────────────────────────────────────┐
│ 1040 Training, based on the conditioning vector, a neural network to: receive (i) │
│ an input audio waveform, and (ii) an input comprising one or more of an input │
│ textual description of a target audio source in the input audio waveform, or an │
│ audio sample of the target audio source, separate audio corresponding to the │
│ target audio source from the input audio waveform, and output the separated │
│ audio corresponding to the target audio source in response to the receiving of │
│ the input                                                           │
└─────────────────────────────────────────────────────────────────────┘
```

FIG. 10

1110 Receiving, by a computing device, an input audio waveform comprising one or more sources of audio

1120 Receiving, by the computing device, one or more of an input textual description of a target source of the one or more sources, or an audio sample of the target source

1130 Generating, by a neural network, a representation of the one or more of the input textual description of the target source, or the audio sample of the target source into a joint embedding wherein an audio embedding of an audio clip is within a threshold distance of a text embedding of a textual description of the audio clip

1140 Generating, based on the representation and by the neural network, a conditioning vector

1150 Separating, by the neural network and based on the conditioning vector, audio corresponding to the target source from the input audio waveform

1160 Providing, by the computing device, the separated audio corresponding to the target source as output by the neural network

FIG. 11

CONDITIONED SEPARATION OF ARBITRARY SOUNDS BASED ON MACHINE LEARNING MODELS

BACKGROUND

Many modern computing devices, including mobile phones, personal computers, and tablets, include audio capture devices, such as microphones and video cameras. The audio capture devices can capture audio from a variety of sources of audio, such as people, animals, music, background sounds, and so forth. Captured videos can include audio that can correspond to entities such as people, animals, landscapes, and/or objects.

Some audio capture devices and/or computing devices can correct or otherwise enhance an audio content. For example, some audio capture devices can provide correction that removes artifacts such as speech distortion, bandwidth reduction, elimination and/or suppression of certain frequency bands, and so forth. After a captured audio has been corrected, the corrected audio can be saved, played, transmitted, and/or otherwise utilized.

SUMMARY

In one aspect, a computing device may be configured to isolate arbitrary sounds in an audio. Accordingly, sound from certain sources can be enhanced, whereas sounds from other sources can be suppressed. Powered by a system of machine-learned components, an audio capture device may be configured to enable users to enhance audio content.

In some aspects, mobile devices may be configured with these features so that audio can be enhanced in substantially real-time. In some instances, audio may be automatically enhanced by the mobile device. In other aspects, mobile phone users can non-destructively enhance an audio to match their preferences. Also, for example, pre-existing audios in a user's library can be enhanced based on techniques described herein.

Disclosed herein is a text-driven neural universal audio separation model, where the text is a natural language description of one or more sounds to be extracted. In some instances, the neural network can be a combination of two components, a first neural network model (also sometimes referred to as SoundWords) which is trained to embed audio and text into an embedding in a shared representation, and a second neural network model (also sometimes referred to as SoundFilter) which is trained to filter out a particular sound from a mixture of sounds, given an embedding from the shared representation. In some aspects, SoundWords may be a contrastively-trained text-audio embedding model, and SoundFilter may be a conditional sound separation model.

In one aspect, a computer-implemented method is provided. The method includes receiving, by a computing device, training data comprising a plurality of audio clips and a plurality of textual descriptions of audio. The method further includes generating a shared representation comprising a joint embedding, wherein an audio embedding of a given audio clip of the plurality of audio clips is within a threshold distance of a text embedding of a textual description of the given audio clip. The method also includes generating, based on the joint embedding, a conditioning vector. The method additionally includes training, based on the conditioning vector, a neural network to receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

In another aspect, a computing device is provided. The computing device includes one or more processors and data storage. The data storage has stored thereon computer-executable instructions that, when executed by one or more processors, cause the computing device to carry out operations. The operations include receiving training data comprising a plurality of audio clips and a plurality of textual descriptions of audio. The operations further include generating a shared representation comprising a joint embedding, wherein an audio embedding of a given audio clip of the plurality of audio clips is within a threshold distance of a text embedding of a textual description of the given audio clip. The operations also include generating, based on the joint embedding, a conditioning vector. The operations also additionally include training, based on the conditioning vector, a neural network to receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

In another aspect, an article of manufacture is provided. The article of manufacture includes one or more computer readable media having computer-readable instructions stored thereon that, when executed by one or more processors of a computing device, cause the computing device to carry out operations. The operations include receiving training data comprising a plurality of audio clips and a plurality of textual descriptions of audio. The operations further include generating a shared representation comprising a joint embedding, wherein an audio embedding of a given audio clip of the plurality of audio clips is within a threshold distance of a text embedding of a textual description of the given audio clip. The operations also include generating, based on the joint embedding, a conditioning vector. The operations also additionally include training, based on the conditioning vector, a neural network to receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

In another aspect, a system is provided. The system includes means for receiving, by a computing device, training data comprising a plurality of audio clips and a plurality of textual descriptions of audio; means for generating a shared representation comprising a joint embedding, wherein an audio embedding of a given audio clip of the plurality of audio clips is within a threshold distance of a text embedding of a textual description of the given audio clip; means for generating, based on the joint embedding, a conditioning vector; and means for training, based on the conditioning vector, a neural network to receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

In another aspect, a computer-implemented method is provided. The method includes receiving, by a computing device, an input audio waveform comprising one or more sources of audio. The method further includes receiving, by the computing device, one or more of an input textual description of a target source of the one or more sources, or an audio sample of the target source. The method also includes generating, by a neural network, a representation of the one or more of the input textual description of the target source, or the audio sample of the target source into a joint embedding wherein an audio embedding of an audio clip is within a threshold distance of a text embedding of a textual description of the audio clip. The method additionally includes generating, based on the representation and by the neural network, a conditioning vector. The method also includes separating, by the neural network and based on the conditioning vector, audio corresponding to the target audio source from the input audio waveform. The method further includes providing, by the computing device, the separated audio corresponding to the target source as output by the neural network.

In another aspect, a computing device is provided. The computing device includes one or more processors and data storage. The data storage has stored thereon computer-executable instructions that, when executed by one or more processors, cause the computing device to carry out operations. The operations include receiving an input audio waveform comprising one or more sources of audio. The operations also include receiving one or more of an input textual description of a target source of the one or more sources, or an audio sample of the target source. The operations also include generating, by a neural network, a representation of the one or more of the input textual description of the target source, or the audio sample of the target source into a joint embedding wherein an audio embedding of an audio clip is within a threshold distance of a text embedding of a textual description of the audio clip. The operations additionally include generating, based on the representation and by the neural network, a conditioning vector. The operations also include separating, by the neural network and based on the conditioning vector, audio corresponding to the target audio source from the input audio waveform. The operations further include providing the separated audio corresponding to the target source as output by the neural network.

In another aspect, an article of manufacture is provided. The article of manufacture includes one or more computer readable media having computer-readable instructions stored thereon that, when executed by one or more processors of a computing device, cause the computing device to carry out operations. The operations include receiving an input audio waveform comprising one or more sources of audio. The operations also include receiving one or more of an input textual description of a target source of the one or more sources, or an audio sample of the target source. The operations also include generating, by a neural network, a representation of the one or more of the input textual description of the target source, or the audio sample of the target source into a joint embedding wherein an audio embedding of an audio clip is within a threshold distance of a text embedding of a textual description of the audio clip. The operations additionally include generating, based on the representation and by the neural network, a conditioning vector. The operations also include separating, by the neural network and based on the conditioning vector, audio corresponding to the target audio source from the input audio waveform. The operations further include providing the separated audio corresponding to the target source as output by the neural network.

In another aspect, a system is provided. The system includes means for receiving, by a computing device, an input audio waveform comprising one or more sources of audio; means for receiving, by the computing device, one or more of an input textual description of a target source of the one or more sources, or an audio sample of the target source; means for generating, by a neural network, a representation of the one or more of the input textual description of the target source, or the audio sample of the target source into a joint embedding wherein an audio embedding of an audio clip is within a threshold distance of a text embedding of a textual description of the audio clip; means for generating, based on the representation and by the neural network, a conditioning vector; means for separating, by the neural network and based on the conditioning vector, audio corresponding to the target audio source from the input audio waveform; and means for providing, by the computing device, the separated audio corresponding to the target source as output by the neural network.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 5A illustrates SI-SDR in dB measured between the target audio clip and the enhanced output for the Clotho evaluation dataset, in accordance with example embodiments.

FIG. 5B illustrates SI-SDR in dB measured between the target audio clip and the enhanced output for the Audiocaps evaluation dataset, in accordance with example embodiments.

FIG. 5C illustrates SI-SDR in dB measured between the target audio clip and the enhanced output for the Freesound evaluation dataset, in accordance with example embodiments.

FIG. 10 is a flowchart of a method, in accordance with example embodiments.

FIG. 11 is another flowchart of a method, in accordance with example embodiments.

DETAILED DESCRIPTION

Figure 1:
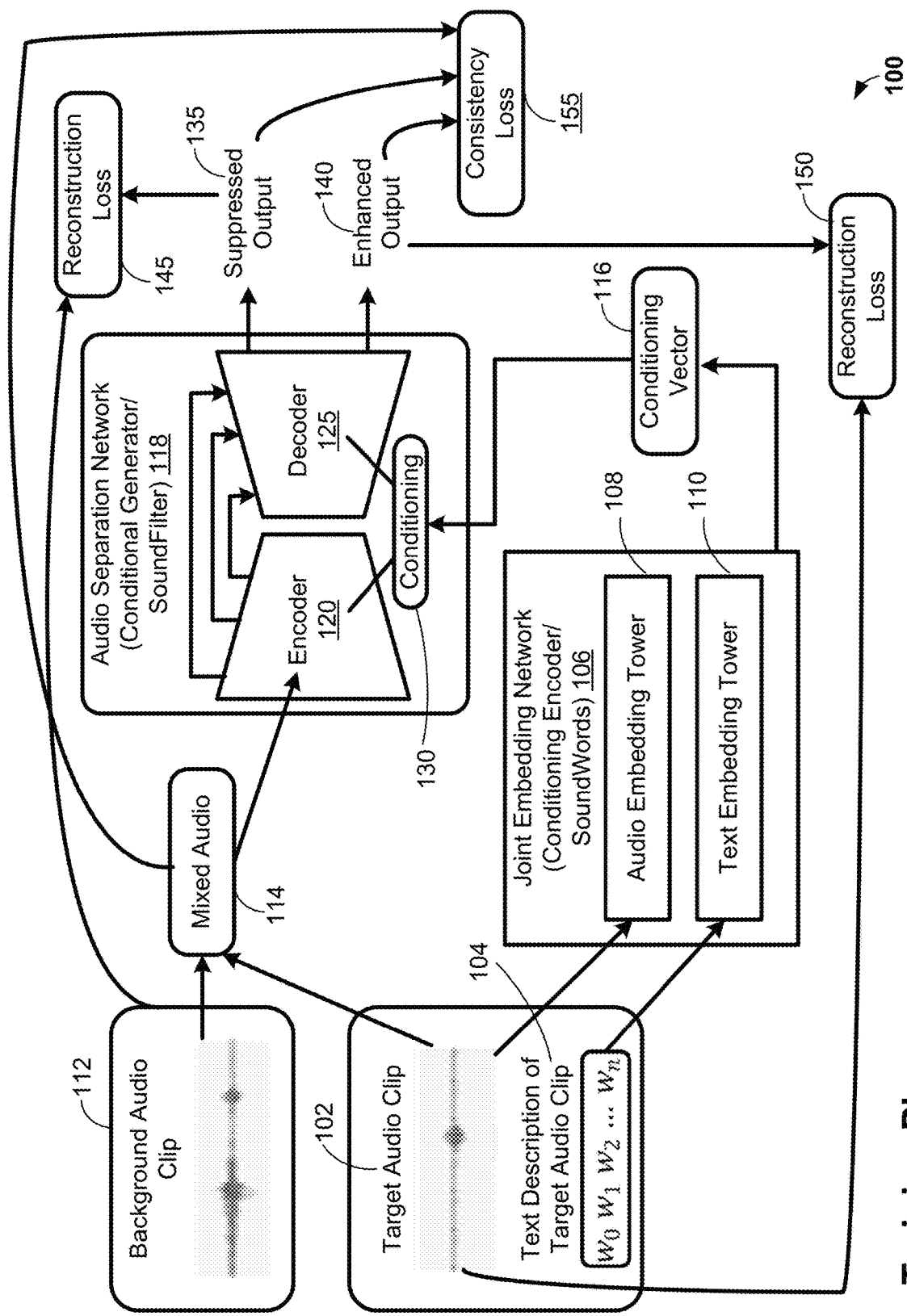
FIG. 1 illustrates an example training phase for a neural network for separation of audio corresponding to a target audio source, in accordance with example embodiments.

Advances in deep learning have led to some advances in audio enhancement technologies in recent years. A particular subject of interest is the problem of extracting, from a single-channel (mono) audio input, which may contain various different sounds, one or more particular sounds. The particular sounds can be described via a text input, or via an audio sample.

Described herein is a method of separating a desired sound source from a single-channel mixture, based on either a textual description or a short audio sample of the target source. In some embodiments, this may be achieved by combining two models. A first model, SoundWords, can be trained to jointly embed both an audio clip and its textual description to the same embedding in a shared representation. A second model, SoundFilter, may take as input, a mixed source audio clip, and separate it based on a conditioning vector from the shared text-audio representation defined by SoundWords. This can make the model agnostic to the conditioning modality, such as text or audio. SoundWords can be effective at learning co-embeddings and a multi-modal training approach improves the performance of SoundFilter. The two models may be trained separately. For example, SoundWords may be trained through contrastive learning using a large set of audio clips paired with associated natural language descriptions, whereas SoundFilter may be trained in a paired approach where training examples are generated by artificially mixing together examples of different sound types.

Use of text as conditioning for audio filtering may be advantageous over conditioning with audio or images. In particular, a text description can be more general, and a text conditioning may work better for types of sounds where the characteristics of the sound can vary a lot. For example, consider that the sound that a car engine makes made during ignition is different from the sounds made while the engine is running continuously. Accordingly, conditioning via text ("car engine") will likely capture both parts of the sound, while conditioning with an audio sample will likely only capture one of the two different engine sounds.

In some aspects, to enable user control of audio enhancement features, the herein-described techniques apply a model based on a neural network to adjust audio content. The herein-described techniques include receiving an input audio and predicting an output audio that enhances particular audio sources, and/or suppresses particular audio sources. In some examples, a trained model of the neural network can work on a variety of computing devices, including but not limited to, mobile computing devices (e.g., smart phones, tablet computers, cell phones, laptop computers), stationary computing devices (e.g., desktop computers), and server computing devices.

A neural network can be trained using a training data set of pairs of audio clips and textual descriptions of the audio clips, to perform one or more aspects as described herein. In some examples, the neural network can be arranged as an encoder/decoder neural network.

In one example, a copy of the trained neural network can reside on a mobile computing device. The mobile computing device can include a microphone that can capture input audio. The input audio may be provided to the trained neural network residing on the mobile computing device. In response, the trained neural network can generate a predicted output audio that enhances, and/or suppresses, one or more audio sources in the input audio. A user of the mobile computing device can then listen to the output audio.

Accordingly, the mobile computing device can enhance the input audio and subsequently output the output audio (e.g., provide the output audio by an audio output device of the mobile computing device). In other examples, the trained neural network is not resident on the mobile computing device; rather, the mobile computing device provides the input audio to a remotely-located trained neural network (e.g., via the Internet or another data network). The remotely-located neural network can process the input audio and provide an output audio to the mobile computing device. In other examples, non-mobile computing devices can also use the trained neural network to modify audio.

In some examples, the trained neural network can work in conjunction with other neural networks (or other software) and/or be trained to recognize whether an input audio is to be enhanced. Then, upon a determination that an input audio is to be enhanced, the herein-described trained neural network could apply SoundWords and SoundFilter to the input audio, separate one or more audio tracks, thereby enhancing the audio associated with the input audio.

As such, the herein-described techniques can improve audio by applying more desirable and/or selectable audio enhancements, thereby enhancing the actual and/or perceived quality of the audio. Enhancing the actual and/or perceived quality of audio can therefore provide benefits by making audio sound clearer, and free of certain background sounds. These techniques are flexible, and so can apply a wide variety of audio enhancements that include arbitrary sound sources.

INTRODUCTION AND OVERVIEW

Mixed audio sources are common in various environments. For example, consider a scenario where an individual walks by a pub in a small town at dusk. The individual may hear a football commentator's chatter get drowned out by cheering, while a car may be driving up the road with music blaring out of open windows of the pub. Also, for example, a cyclist may be ringing their bell somewhere behind the individual. As another example, across the road from the individual, an individual may be working in their workshop drilling holes into a wall, and an owl may be heard hooting in the distance. Humans are generally trained to selectively choose to listen to the sounds based on audio sources that may be relevant to them, while ignoring the remaining sounds. For example, the individual may be tuned in to hear the car with the music, and the cyclist ringing the bell, but may filter out the distant hooting of the owl. Computers, on the other hand, generally struggle at this task, especially if the audio is only provided as a single channel input and the goal is to focus on an arbitrary sound, e.g., the music from the car or traffic noise.

Generally, when a type of audio to focus on is known in advance, dedicated enhancement algorithms may be trained to separate that audio, and suppress other audio. In some instances, systems may be built to enhance speech, and/or extract audio corresponding to individual musical instruments. There are also models that may address universal sound separation, where the goal is to split a single channel audio mixture into its individual component signals regardless of their class. Such methods may be utilized followed by a subsequent selection step that picks which component signal the user may want to focus on. While this approach may be somewhat more versatile than having a set of predefined target classes, it typically requires estimation of each separate sound in the mixture, making the user interface more complicated and requiring more computational resources as compared to enhancing only one type or class of target sound.

Some existing methods are based on conditioning a behavior of a neural sound separation model to exploit additional information present in modalities other than audio. In particular, audio-visual methods for specific tasks such as speech enhancement, and separating limited sets of classes such as musical instruments, may be used. Audio-visual universal separation models can also be trained to separate all sounds that originate from visible on-screen objects. Other examples of conditioning inputs may include accelerometer data to improve speech enhancement, target speaker embedding for speech separation, or sound class for universal separation, using either a vector indicating desired one or more source classes, or an audio clip from a desired class of sound. Conditioning may be generally performed by injecting a sound separation network with embeddings extracted from the conditioning input.

Universal sound separation, such as a task of separating all sounds from an acoustic mixture regardless of class, may be achieved with supervised data. Some weakly supervised methods can use sound class as weak labels. In some instances, completely unsupervised methods can learn directly from raw mixtures of sounds.

Some example universal sound separation models may be conditioned based on images or audio. However, such conditioning may result in an ambiguity as to how specifically the model may interpret the provided conditioning. For example, if the model is provided with an image of an owl hooting, it may not be clear for the model as to whether it may focus on all bird sounds, on sounds made by owls only, or sounds made by this particular individual owl. Also, for example, it may not be clear for the model as to whether it may focus on hooting sound made by the owl, but not other sounds such as, for example, a flapping sound made by the owl. Similar types of ambiguities may arise when the conditioning is based on audio only. There may be additional complexities in audio conditioning, as some types of sound may change greatly over time. For example, the starting noise of an engine is not the same as a constant purr when the engine is running.

Text conditioning for separation models generally relies upon a textual transcript of a target speaker. For example, text-informed nonnegative matrix factorization for speech separation can be performed. As another example, lyric-informed singing voice separation can also be performed. Some computer vision models involve joint image and natural language embedding models. Rather than relying on fixed ontologies, such models provide a natural interface to support cross-modal retrieval and zero-shot classification applications. Also, for example, some joint embedding models are built on top of separately trained and fixed neural audio and text embeddings. Although such joint embeddings have been evaluated on a cross-modal retrieval task, the models have not been considered in a separation or generative audio application.

Generally, a universal sound separation process is more effective when an output of the model is conditioned on a textual description of the target sound. Accordingly, there is a need for a text-driven machine learning based universal sound separation model, where the text is a natural language description of a target sound to be extracted. As described herein, a model may be conditioned on arbitrary textual descriptions of sound, while allowing audio conditioning as an alternative. However, when a model is trained using only textual descriptions, then the limited amount of data may cause overfitting issues. To alleviate this problem, an embedding model may be trained to co-embed audio clips and their textual descriptions close together in the same embedding space. Using this embedding model, an audio separation model may be trained using both audio and text conditioning.

Network Architecture

FIG. 1 illustrates an example training phase 100 for a neural network for separation of audio corresponding to a target audio source, in accordance with example embodiments.

In some embodiments, training data comprising a plurality of audio clips and a plurality of textual descriptions of audio, may be received. For example, a dataset comprising target audio clip 102 and a textual description 104 of target audio clip 102 may be received. Target audio clip 102 may be an audio sample of a sound, such as, for example, an animal sound, a bird sound, a sound made by an instrument, engine sounds of various types of vehicles, sound of water in different settings, human voices and other sounds made by humans, nature sounds, and so forth. Each target audio clip 102 may be associated with textual description 104.

In some embodiments, textual description 104 may be a natural language description of target audio clip 102. For example, an audio clip for a hoot of an owl may be associated with a textual description "hooting of an owl," "an owl hooting," "owl hoot," and so forth. As may be noted, there may be a plurality of audio clips for each type of sound. For example, an audio clip for an owl hooting may include audio clips of varying length from a single audio recording, audio clips corresponding to the same owl but at different times, and/or locations, audio clips corresponding to different owls, and so forth.

Also, for example, a textual description "owl hoot" may be associated with one or more audio clips corresponding to an owl hooting. However, a textual description "hooting horn" may be associated with one or more audio clips of a sound made by a horn of a car, such as, for example, a blaring sound, a blasting sound, a tooting sound, and so forth. As another example, "hoot with laughter" may be associated with one or more audio clips of human sounds corresponding to scorn, disapproval, merriment, and so forth.

In some embodiments, extraction of a target audio may be performed by a model that includes one or more components. In some embodiments, a shared representation comprising a joint embedding is generated, wherein an audio embedding of a given audio clip of the plurality of audio clips is within a threshold distance of a text embedding of a textual description of the given audio clip. For example, a sound extraction model may include a conditioning encoder 106 (also sometimes referred to as SoundWords or a joint embedding network, or a second neural network) that takes an input vector based on either text 104 or audio 102 and computes the corresponding embedding. For example, conditioning encoder 106 may be trained on a pair, (audio, text), that may include a wide range of scales, supervisory quality, and language usage patterns. As an illustrative example, a first collection of approximately 50 million, 10-second sound clips extracted from randomly selected interne videos (1 clip/video) may be utilized. The associated text may be names and natural language descriptions of knowledge graph entities associated with each video.

As another illustrative example, a second collection may be samples from an AudioSet dataset that includes approximately 2 million, 10-second audio clips. This dataset covers approximately 527 sound event categories. For example, AudioSet consists of an expanding ontology of 632 audio event classes and a collection of 2,084,320 human-labeled sound clips drawn from YouTube videos. The ontology is specified as a hierarchical graph of event categories, covering a wide range of human and animal sounds, musical instruments and genres, and common everyday environmental sounds. In some aspects, the natural language diversity here may be limited with only one or two label variations per class. The associated text may include (i) standard human-readable labels associated with each audio clip in the dataset; (ii) a set of human-provided natural language sound descriptions that may be collected (e.g., approximately 50K of the AudioSet clips); and (iii) the AudioCaps dataset which includes natural language descriptions for approximately 46K AudioSet clips. AudioCaps is a large-scale dataset of about 46K audio clips to human-written text pairs collected via crowdsourcing on the AudioSet dataset.

As another example, a third collection may include approximately 110K sound events and/or scene recordings from a library, such as Pro Sound Effects Library. Each recording may be paired with a textual description. In some embodiments, the textual description may be an unstructured list of tags, a multiple-sentence natural language description, and so forth.

In some embodiments, the sound extraction model may include a conditional generator 118 (also sometimes referred to as SoundFilter or an audio separation network or a neural network), which takes the mixture audio 114 and the conditioning embedding 116 as input, and predicts a filtered output. In some embodiments, the filtered output may include one or more of suppressed output 135 and enhanced output 140.

Generally, the two models, conditioning encoder 106 and conditional generator 118, may be trained separately, as they may involve different types of training data. For example, conditioning encoder 106 may be trained on audio samples paired with respective textual descriptions, and conditional generator 118 may be trained either with text or with audio as conditioning.

In some embodiments, training data for conditional generator 118 may involve a combination of datasets. As an illustrative example, a Clotho dataset (e.g., containing 5929 audio clips each with 5 different captions describing them) may be used. The dataset may be split into development (e.g., including 3840 clips), evaluation (e.g., including 1045 clips), and validation (e.g., including 1045 clips) subsets. Also, for example, an AudioCaps dataset containing 38118 clips for training and 979 clips for evaluation, may be utilized.

As another illustrative example, recordings of various types of sounds provided by one or more users via Freesound may be used. Freesound is a collaborative database of sounds licensed by the Creative Commons (CC). As another example, audio from the Free Universal Sound Separation (FUSS) dataset may be used. FUSS uses clips from Freesound Dataset 50k (FSD50k), which provides manually verified labels for 200 classes, a subset of the AudioSet ontology. FUSS uses a subset of FSD50k clips that are CC0-licensed and annotated with only a single label. In some embodiments, the labels may be used as the textual description of the audio.

Some embodiments involve receiving third training data comprising a second plurality of audio clips 112 comprising one or more background sounds. Background audio is generally not associated with a label or a caption. For illustrative purposes only, the FSD50k dataset can be used. Also, for example, to illustrate a training dataset, one million 10-second audio clips from internet videos may be used during training. Such embodiments also involve mixing the plurality of audio clips 102 in the plurality of pairs and the one or more background sounds 112 to generate a third plurality of audio clips, mixed audio 114. The training of conditional generator 118 may be based on the third plurality of audio clips 114. In some of these embodiments, the second plurality of audio clips comprising the one or more background sounds 112 may be synthetically generated.

As another training illustration, conditional generator 118 may be trained by using audio data from two data sources, such as, for example, unlabeled background audio clips 112 and labeled or captioned audio clips. In this context, background audio generally refers to audio that may not be desirable for a certain purpose, and may include sounds present in the training datasets described herein. In some embodiments, each training example may be constructed from one clip of each data source. Target audio clip 102 may be, for example, a 2 second random crop from the captioned audio clip. In some embodiments, this may be added to a 2 second random crop from the background audio 112, with a random gain between −4 decibel (dB) and +4 dB, to create mixed audio 114 input to conditional generator 118. Also, for example, a second non-overlapping 2 s random crop may be taken from the captioned audio and may be used as the conditioning audio. As another illustrative example, conditional generator 118 may be trained for one million steps on 32 Google Cloud TPU v3 cores using a batch size of 512.

In some embodiments, the training of conditional generator 118 may include selecting conditioning vector 116 to be a first conditioning vector corresponding to a textual description or a second conditioning vector corresponding to an audio sample, wherein the selecting is based on a training text rate parameter indicative of a relative proportion of the first conditioning vector to the second conditioning vector. For example, during training, either text or audio may be randomly chosen as conditioning. In some embodiments, conditioning encoder 106 may include audio embedding tower 108 to generate the audio embedding, and a text embedding tower 110 to generate the textual embedding. In some embodiments, conditioning vector 116 may be generated based on the joint embedding of the audio embedding and the textual embedding.

In some embodiments, a balance between the first conditioning vector and the second conditioning vector may be controlled by a training text rate parameter. In either case, the embedding may be computed using a pre-trained conditional encoder 106, using either the text embedding tower 110 or the audio embedding tower 108. Generally, for joint embedding, each pair of text and audio are co-located, and text and audio from different pairs are separated in the embedding space, and this can be trained based on contrastive learning.

In some embodiments, based on the conditioning vector, neural network 100 may be trained to: receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input. For example, conditional generator 118 may receive an input audio waveform from which a target source is to be extracted, separated, or filtered out. In some embodiments, the input audio waveform may be a single channel mixed audio. For example, the input audio waveform may be a single channel audio that includes one or more audio sources, such as, a car horn, a hooting of an owl, human voices in a nearby store, and a sound of a car engine. Also, for example, conditional generator 118 may receive either a textual description of the target audio source or an audio sample of the target audio source. For example, conditional generator 118 may receive a text input such as "car engine" or an audio sample of a car engine. In some embodiments, conditioning encoder 106 may embed the text input and/or the audio sample in a shared representation, and generate conditioning vector 116. As described herein, conditioning vector 116 may be generated based on the joint embedding of the audio embedding and the textual embedding.

In some embodiments, conditioning on text may be performed as a conditioning on free form text. Accordingly, text inputs for car sounds such as, "car sound," "ultimate car sound," "racing car," "electric car," and so forth, may cause the neural network to behave differently, as it is not constrained by predefined classes. Also, for example, the conditioning is multimodal, and can be performed on text alone, audio alone, or a combination of the two.

In some embodiments, the training of conditional generator 118 may involve training conditional generator 118 to generate, from the input audio waveform, first audio 140 (also sometimes referred to as an enhanced output) described by conditioning vector 116, and generate, from the input audio waveform, second audio 135 (also sometimes referred to as a suppressed output) comprising the one or more background sounds not described by conditioning vector 116. For example, given pairs of mixed audio clips 114 and conditioning vectors 116, conditional generator 118 may output two audio clips of the same length as the mixed audio input 114. The first output, first audio 140, generally includes the audio described by conditioning vector 116, and may be referred to as an "enhanced" or "tuned" audio. Also, for example, conditional generator 118 may output second audio 135, also sometimes referred to as "suppressed" audio. Second audio 135 may include background sounds not described by conditioning vector 116. In the previous example, first audio 140 may be the audio corresponding to the sound of the car engine, and second audio 135 may correspond to all other sounds in the input audio waveform (e.g., car horn, a hooting of an owl, human voices in a nearby store, other background sounds). Although the model is illustrated with two outputs, the model may output only first audio 140, or second audio 135. In some embodiments, the model may output more than two outputs. For example, two or more tracks may be enhanced and/or suppressed. Although training losses (described below) are illustrated with two outputs, fewer or more losses may be used, and/or the loss functions described may be modified accordingly.

Training of conditional generator 118 may involve computing one or more training losses. Some embodiments involve determining a reconstruction loss 145 between second audio 135 and the third plurality of audio clips comprising background audio clips 112. For example, second audio 135 may correspond to a filtered version of the input audio waveform that includes sounds in the input audio waveform (e.g., car horn, a hooting of an owl, human voices in a nearby store) that are different from the target source, the sound of the car engine. Accordingly, reconstruction loss 145 evaluates a quality of second audio 135 with respect to background audio clips 112.

Some embodiments involve determining a reconstruction loss 150 between first audio 140, and target audio 102. For example, first audio 140 may correspond to a filtered version of the input audio waveform that includes the target source, the sound of the car engine. Accordingly, reconstruction loss 150 evaluates a quality of first audio 140 with respect to target audio 102.

Each of the aforementioned reconstruction losses may be computed using a scale-invariant signal-to-distortion ratio (SI-SDR). Generally, SI-SDR value is an overall measure of quality of a source sound. In particular, scale-invariance removes SDR's dependency on an amplitude scaling of the audio signal. The SI-SDR may be used to compute a loss measure as follows:

$$\text{SI\_SDR loss}(x,y) = -\text{softplus}(K - \text{SI\_SDR}(x,y)) \quad \text{(Eqn. 1)}$$

The parameter K is a constant that may be chosen based on a particular application. Some example choices may be, for example, 20, 30, or 40. For reconstruction loss 145, the pair (x, y) in Eqn. 1 may correspond to second audio 135 and background audio clips 112. For reconstruction loss 150, the pair (x, y) in Eqn. 1 may correspond to first audio 140 and target audio 102. Generally, the loss function, SI_SDR loss (x, y), has to approach a zero value, so that an output (e.g., first audio 140, second audio 135) may be a desired (e.g., optimal) output. Generally, a better quality output results in a higher value for SI_SDR (x, y), and vice versa. The constant K may be chosen based on an expected magnitude of SI_SDR(x, y), and this allows Eqn. 1 to become a useful loss function.

Some embodiments involve determining a consistency loss 155 between first audio 140, second audio 135, and third plurality of audio clips or mixed audio 114. For example, consistency loss 155 may be computed between the mixed audio input clip and a sum of both output clips. Generally, consistency loss 155 induces the model to decide which parts of the audio belong to which output. A standard SNR may be converted into a loss function in a manner analogous to SI-SDR, as described herein. In some training phases, checkpoints may be written at various points (e.g., every 50 k steps), and after training, a checkpoint that optimizes (e.g., minimizes) an embedding distance (e.g., a VGGish embedding distance) may be selected. VGGish is derived from the Visual Geometry Group (VGG) image recognition architecture and is trained on a large dataset of YouTube videos, similar to YouTube-8M as an audio classifier with over 3000 classes.

In some embodiments, the generating of the shared representation includes training a second neural network to generate the joint embedding, and generating the conditioning vector from the joint embedding. The training of the second neural network may be based on second training data comprising a plurality of pairs, each pair comprising an audio clip and a textual description of the audio clip. For example, target audio clip 102 and a textual description 104 of target audio clip 102 may be received. Target audio clip 102 may be an audio sample of a sound, such as, for example, an animal sound, a bird sound, a sound made by an instrument, engine sounds of various types of vehicles, sound of water in different settings, human voices and other sounds made by humans, nature sounds, and so forth. Each target audio clip 102 may be associated with textual description 104. Accordingly, the plurality of pairs may be "(target audio clip 102, textual description 104)." Such a pairing is generally a many to many mapping. In other words, each target audio clip 102 may be paired with a plurality of textual descriptions 104, and each textual description 104 may correspond to a plurality of target audio clips 102.

In some embodiments, textual description 104 may be a natural language description of target audio clip 102. For example, an audio clip for a hoot of an owl may be associated with a textual description "hooting of an owl," "an owl hooting," "owl hoot," and so forth. Accordingly, the plurality of pairs may include "(audio clip for owl hooting, hooting of an owl)," or "(audio clip for owl hooting, owl hoot)," and so forth. As may be noted, there may be a plurality of audio clips for each type of sound. For example, an audio clip for an owl hooting may include audio clips of varying length from a single audio recording, audio clips corresponding to the same owl but at different times, and/or locations, audio clips corresponding to different owls, and so forth. Also, for example, a textual description may describe a plurality of audio clips.

In some embodiments, conditioning encoder 106 may be a joint embedding model of natural language and sound that includes dedicated towers for each, but that may be trained to terminate in the same target space. Similar to existing techniques, contrastive learning may be performed using a large set of audio clips paired with associated natural language descriptions. By applying a contrastive multi-view coding loss function the learned embedding acts to co-locate, in the same target space, audio and its underlying semantic categories expressed via freeform natural language.

In some embodiments, training of conditioning encoder 106 may be warm-started from separate audio and text encoder models. For example, conditioning encoder 106 may include dedicated towers, such as audio embedding tower 108 to generate an audio embedding, and a text embedding tower 110 to generate a textual embedding. As an illustrative example, audio embedding tower 108 may include a modified Resnet-50 (e.g., Resnetish-50) architecture trained over a plurality of 64-channel log mel spectrograms. Mel encoding may be performed by converting a signal into a mel-scale magnitude spectrogram and back again using the original input phase. One or more mel variants may be used, such as, narrow, where the mel bins only covers the frequency range from 60 to 8000 Hz, and wide, which covers everything from 0 to 16,000 Hz. In some embodiments, audio embedding tower 108 may be pretrained. In some embodiments, a final classifier layer of the Resnetish-50 architecture may be replaced with a fully connected final layer with a number of units corresponding to a dimension of the shared representation. For example, the fully connected final layer may map to a shared embedding space (e.g., a 64-dimensional). As another illustrative example, audio embedding tower 108 may take as input, short clips (e.g., 10-second clips), and apply average pooling on frame-level outputs to produce a single clip-level embedding.

In some embodiments, for text embedding tower 110, a publicly available uncased Bidirectional Encoder Representations from Transformers (BERT) based embedding model may be used. As an illustrative example, a transformer architecture based on a special classification token (CLS-token) pooling may be used, with a fully connected final layer to map to the shared representation. CLS is the last hidden state of BERT. For example, the fully connected final layer may map to the shared embedding space (e.g., the 64-dimensional space).

In some embodiments, after initialization of the model, parameters in audio embedding tower 108 and text embedding tower 110 may be updated during training. Each batch may be constructed with a preset mix of training data sources. For illustrative purposes, the preset mix may include 30% from the 50M video dataset, 5% from the 50K collected captions dataset, 25% from the AudioCaps dataset, 10% from AudioSet labels dataset, and 30% from the Pro Sound dataset. Other combinations are considered within a general scope of this description. In some embodiments, an optimization of these proportions may not be performed for training. Training losses may be computed over examples across multiple accelerators, leading to an effective batch size (e.g., 6144) of target audio-text pairs. In some embodiments, an Adam optimizer with learning rate 5e-5 may be used, with a trainable softmax temperature with an initial value (e.g., 0.1).

In some embodiments, conditional generator 118 includes a symmetric encoder-decoder U-net neural network with skip-connections. For example, the architecture may include a symmetric encoder 120-decoder 125 U-net network with skip-connections, operating in the waveform domain, where the architecture of the decoder 125 layers mirrors the structure of the encoder 120, and the skip-connections run between each encoder block and its mirrored decoder block and conditioning 130 is performed based on conditioning vector 116.

Figure 2A:
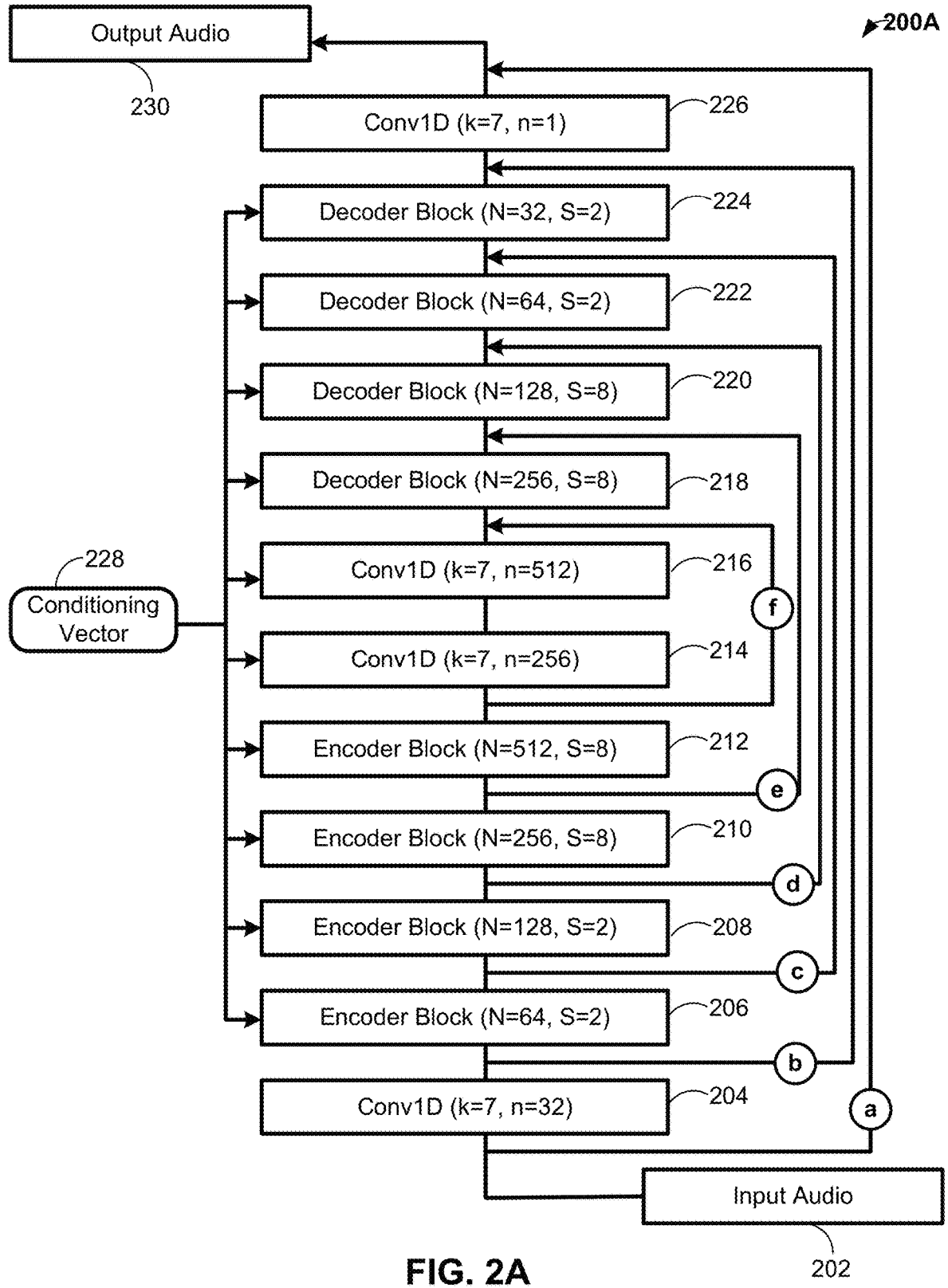
FIG. 2A is a block diagram depicting an example U-net neural network for separation of audio corresponding to a target audio source, in accordance with example embodiments.

FIG. 2A is a block diagram depicting an example U-net neural network for separation of audio corresponding to a target audio source, in accordance with example embodiments. In some embodiments, neural network 200A can be a fully-convolutional neural network as described herein. The example neural network (e.g., type, number, and/or arrangement of the network, and/or of various blocks/layers), and values of various parameters (e.g., n, N, k, S) used herein are intended for illustrative purposes only. During training, neural network 200A can receive as inputs an input audio 202. For example, input audio 202 may be an input audio waveform, a single channel mix of one or more sources of audio. Neural network 200A can include layers of nodes for processing input audio 202. Example layers can include, but are not limited to, input layers, convolutional layers, activation layers, pooling layers, and output layers. Input layers can store input data, such as a feature representation of input audio 202, and inputs from other layers of neural network 200A. Convolutional can compute an output of neurons connected to local regions in input audio 202. In some examples, the predicted outputs can be fed back into the neural network 200A again as input to perform iterative refinement. Activation layers can determine whether or not an output of a preceding layer is "activated" or actually provided (e.g., provided to a succeeding layer). Pooling layers can downsample the input. For example, neural network 200A can involve one or more pooling layers downsampling the input by a predetermined factor (e.g., a factor of two). Output layers can provide an output of neural network 200A to software and/or hardware interfacing with neural network 200A; e.g. to hardware and/or software used to display, print, communicate and/or otherwise provide filtered audio.

As illustrated, neural network 200A can include a convolutional layer 204 that can compute an output of neurons connected to local regions in input audio 202. In some embodiments, neural network 200A may include four encoder blocks 206, 208, 210, and 212. Each of the four encoder blocks may be mirrored by four decoder blocks, 218, 220, 222, and 224, and the skip-connections run between each encoder block and its mirrored decoder block, as indicated by the arrows connecting the encoder and decoder blocks.

For example, skip connection "a" connects input to output; skip connection "b" connects convolutional block 204 with convolutional block 226; skip connection "c" connects encoder block 206 with decoder block 224; skip connection "d" connects encoder block 208 with decoder block 222; skip connection "e" connects encoder block 210 with decoder block 220; and skip connection "f" connects encoder block 212 with decoder block 218. In some embodiments, convolutional layers 204, 214, 216, 226 may be 1D convolutional layers with varying kernel sizes, k, and input channel sizes, n. For example, convolutional layer 204 may be configured with a kernel size, k=7, and input channel size, n=32; convolutional layer 214 may be configured with a kernel size, k=7, and input channel size, n=256; convolutional layer 216 may be configured with a kernel size, k=7, and input channel size, n=512; and convolutional layer 226 may be configured with a kernel size, k=7, and input channel size, n=1. The term, kernel size, generally refers to the size of a convolving kernel.

Each encoder and decoder block may be configured with varying output channels, N, and strides, S. For example, encoder block 206 may be configured with an output channel size, N=64, and a stride, S=2. Also, for example, encoder block 206 may be connected to mirrored decoder block 224 via skip connection "c", and decoder block 224 may be configured with an output channel size, N=32, and a stride, S=2. Similarly, encoder block 208 may be configured with an output channel size, N=128, and a stride, S=2. Also, for example, encoder block 208 may be connected to mirrored decoder block 222 via skip connection "d", and decoder block 222 may be configured with an output channel size, N=64, and a stride, S=2. As another example, encoder block 210 may be configured with an output channel size, N=256, and a stride, S=8. Also, for example, encoder block 210 may be connected to mirrored decoder block 220 via skip connection "e", and decoder block 220 may be configured with an output channel size, N=128, and a stride, S=8. As another example, encoder block 212 may be configured with an output channel size, N=512, and a stride, S=8. Also, for example, encoder block 212 may be connected to mirrored decoder block 218 via skip connection "f", and decoder block 218 may be configured with an output channel size, N=256, and a stride, S=8. An output layer may generate output audio 230. In some aspects, output audio 230 may be a separated target audio.

In some embodiments, conditioning may be introduced into the model via feature wise linear modulation (FiLM) conditioning, which may be applied to one or more layers in the encoder, decoder, and/or bottleneck. Generally, FiLM conditioning corresponds to modulating intermediate activations between neural network layers by predicting a scale and a bias from conditioning vector 228. For example, conditioning vector 228 may be introduced in one or more of blocks 206 through 224. Although not depicted in FIG. 2A, in some embodiments, a group normalization may be applied after each Conv1D operation, and an ELU activation function may be used for all nonlinearities in the SoundFilter model (e.g., in conditional generator 118). For conditioning purposes, variations may be introduced in an audio sample. For example, different portions of the audio sample may be used, including spatial and temporal shifts, volume modulations, audio enhancements, augmentations of the audio sample, and so forth.

Figure 2B:
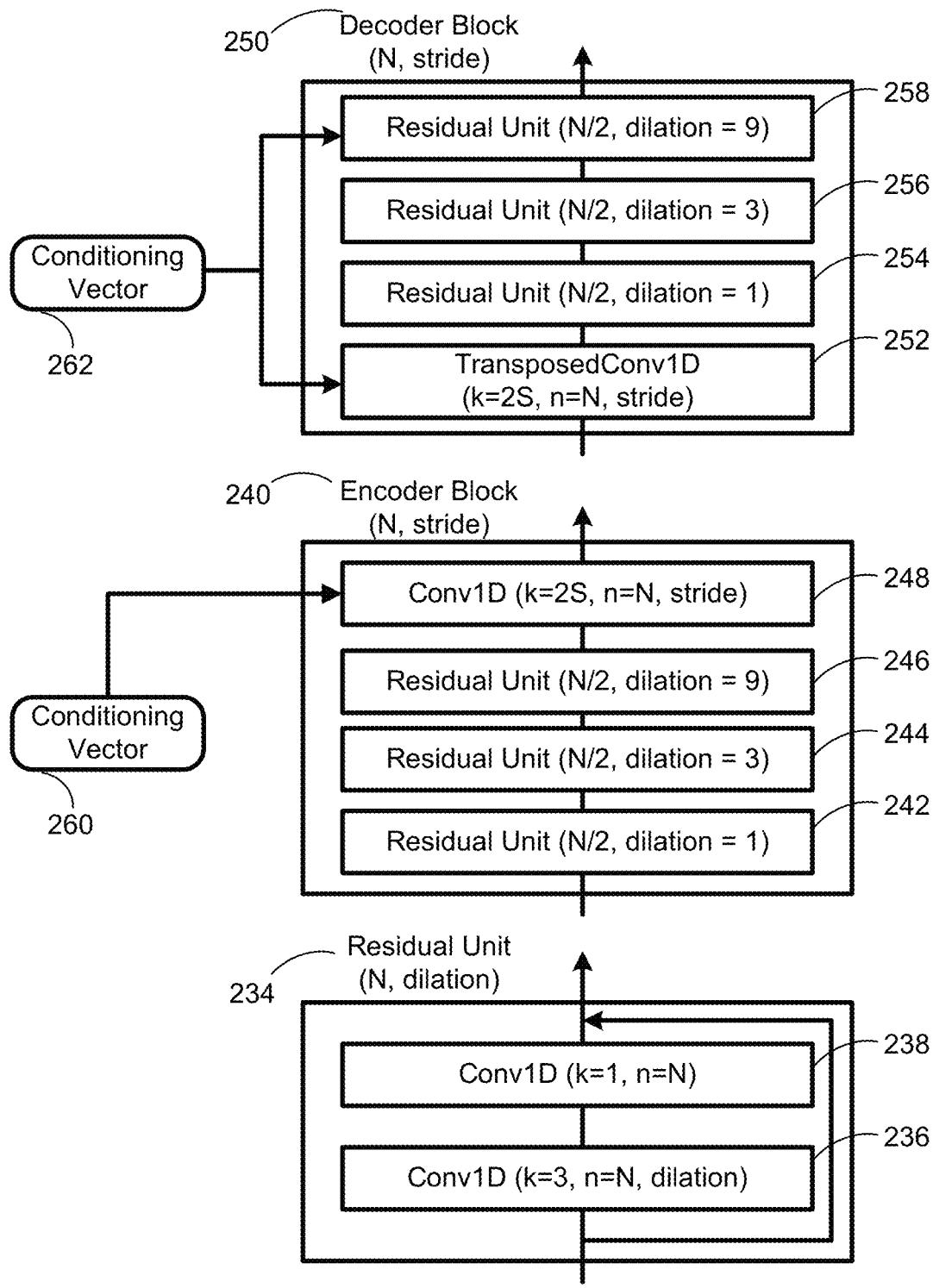
FIG. 2B is another block diagram depicting an example U-net neural network for separation of audio corresponding to a target audio source, in accordance with example embodiments.

FIG. 2B is another block diagram 200B depicting an example U-net neural network for separation of audio corresponding to a target audio source, in accordance with example embodiments. In particular, block diagram 200B is a detailed outline of an example conditioned audio-to-audio U-net architecture. The architecture (e.g., type, number, and/or arrangement of various blocks/layers), and values of various parameters (e.g., n, N, k, S) used herein are intended for illustrative purposes only. Residual unit 234 can be associated with an output channel size, N, and a dilation. In some aspects, residual unit 234 can include convolutional layer 236 with kernel size, k=3, same number of input and output channel sizes, n=N, and the dilation associated with residual unit 234. Residual unit 234 can also include convolutional layer 238 with kernel size, k=1, and the same number of input and output channel sizes, n=N.

Encoder block 240 may be associated with an output channel size, N, and a stride, S. Conditioning may be introduced into the model via feature wise linear modulation (FiLM) conditioning, by introducing conditioning vector 260. Encoder block 240 may include three residual units 242, 244, and 246, and an additional convolutional layer 248. Each residual unit 242, 244, 246, may be configured as described with respect to residual unit 234. For example, each residual unit 242, 244, 246, may be configured with an output channel size of N/2. Also, for example, residual unit 242 may be associated with a dilation of 1, residual unit 244 may be associated with a dilation of 3, and residual unit 246 may be associated with a dilation of 9. Convolutional layer 248 may have the same stride as associated with encoder block 240, a kernel size that is twice the stride, k=2S, and same number of input and output channel sizes, n=N.

Decoder block 250 may mirror encoder block 240. Decoder block 250 may be associated with an output channel size, N, and a stride, S. Conditioning may be introduced into the model via FiLM conditioning, by introducing conditioning vector 262. Decoder block 250 may include three residual units 254, 256, 258, that mirror residual units 242, 244, and 246 of encoder block 240, and an additional convolutional layer 252, that is a transpose of convolutional block 248 of encoder block 240. Each residual unit 254, 256, 258, may be configured as described with respect to residual unit 234. For example, each residual unit 254, 256, 258, may be configured with an output channel size of N/2. Also, for example, residual unit 254 may be associated with a dilation of 1, residual unit 256 may be associated with a dilation of 3, and residual unit 258 may be associated with a dilation of 9. Convolutional layer 252 may be a TransposedConv1D layer, with the same stride as associated with decoder block 250, a kernel size that is twice the stride, k=2S, and same number of input and output channel sizes, n=N.

Figure 3:
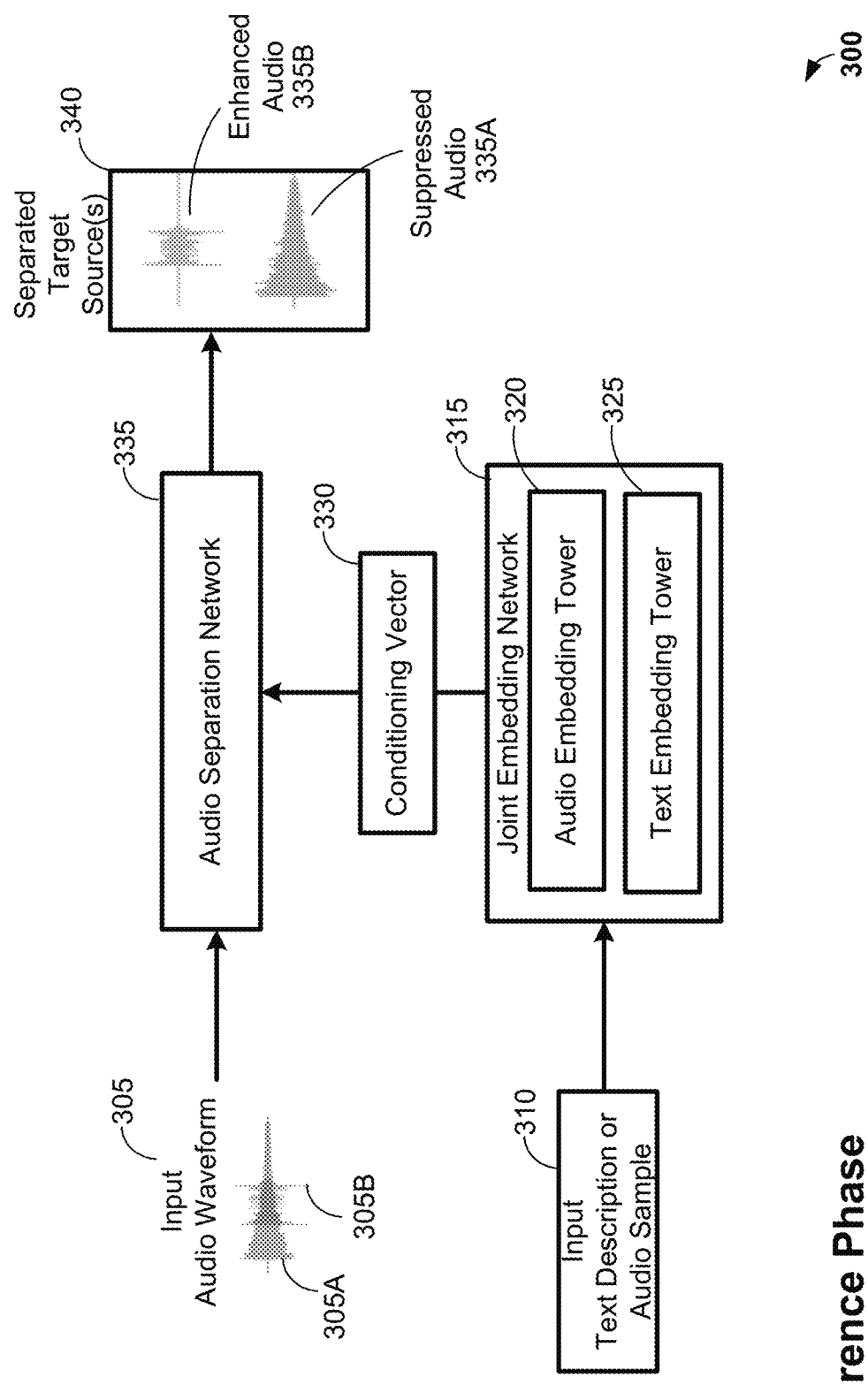
FIG. 3 illustrates an example inference phase for a neural network for separation of audio corresponding to a target audio source, in accordance with example embodiments.

FIG. 3 illustrates an example inference phase for a neural network 300 for separation of audio corresponding to a target audio source, in accordance with example embodiments. In some embodiments, input audio waveform 305 comprising one or more sources of audio may be received. For example, input audio waveform 305 may include audio sources 305A and 305B, one or more of which may comprise a mixture of various audio sources. For example, input audio waveform 305 may be a single channel audio that includes one or more audio sources, such as, audio source 305A that includes a car horn, a hooting of an owl, and human voices in a nearby store (in addition to one or more background sounds), and audio source 305B that includes a sound of a car engine. Input audio waveform 305 may be received by audio separation network 335. In some embodiments, audio separation network 335 may share one or more aspects in common with conditional generator 118 of FIG. 1, and may comprise an architecture described with reference to FIGS. 2A and 2B. Also, for example, audio separation network 335 may have been trained as described with respect to conditional generator 118 of FIG. 1.

In some embodiments, one or more of an input textual description of a target source of the one or more sources, or an audio sample of the target source, may be received as input 310. For example, input 310 may be a text input such as "car engine" or an audio sample of a car engine. For example, a user of a mobile device may enter the text input, "car engine", into a text input interface, or utter "car engine" as human speech into an audio input device connected to the mobile device. An automatic speech recognition system may recognize the speech and convert it to a text input. Also, for example, users may input an audio sample of a car engine. In some embodiments, the user may record the sound of a passing car and input the recorded sound as input 310. Additional and/or alternative means of inputting input 310 may be possible. Input 310 may be received by joint embedding network 315. In some embodiments, joint embedding network 315 may share one or more aspects in common with conditioning encoder 106 of FIG. 1. Also, for example, joint embedding network 315 may have been trained as described with respect to conditioning encoder 106 of FIG. 1.

In some embodiments, neural network 300 may generate a representation of the one or more of the input textual description of the target source, or the audio sample of the target source into a joint embedding wherein an audio embedding of an audio clip is within a threshold distance of a text embedding of a textual description of the audio clip. As previously described, joint embedding network 315 may embed input 310 in a shared representation. For example, when input 310 is a textual description of a target source, a text embedding tower (e.g., text embedding tower 110 of FIG. 1) may generate a text embedding. Also, for example, when input 310 is an audio sample of a target source, an audio embedding tower (e.g., audio embedding tower 108 of FIG. 1) may generate an audio embedding.

In some embodiments, neural network 300 may generate a conditioning vector based on the representation. For example, joint embedding network 315 may generate conditioning vector 330 based on the embedding of input 310. Conditioning vector 330 may be conditioning vector 116 of FIG. 1, conditioning vector 228 of FIG. 2A, or conditioning vector 260 or 262 of FIG. 2B. Generally, textual descriptions may not exhaustively describe the associated audio, and may omit some sound sources that may be present in an audio conditioning extracted from the same clip. In some embodiments, neural network 300 may be configured to select a balance between text and audio conditioning based on a training text rate parameter.

In some embodiments, neural network 300 may separate audio corresponding to the target audio source from the input audio waveform based on the conditioning vector. For example, audio separation network 335 may take input audio waveform 305 and conditioning vector 330 and separate the target source. For example, separated target source 340 may include suppressed audio 335A (e.g., suppressed output 135 of FIG. 1), and enhanced audio 335B (enhanced output 140 of FIG. 1). For example, suppressed audio 335A may be filtered output corresponding to audio source 305A that includes a car horn, a hooting of an owl, and human voices in a nearby store. Also, for example, enhanced audio 335B may be filtered output corresponding to audio source 305B that includes a sound of a car engine, in response to "car engine" as input 310.

In some embodiments, the separated target source, as output by neural network 300, may be provided. For example, separated target source 340 (or one of suppressed audio 335A or enhanced audio 335B) may be output via an audio output device. In some embodiments, one or more of suppressed audio 335A or enhanced audio 335B may be provided to an audio processing component to enhance, and/or suppress one or more aspects of separated target source 340. Additional and/or other alternative applications are possible.

In some embodiments, neural network 300 may include a first neural network 315 and a second neural network 335. The generating of the representation may be performed by first neural network 315. The generating of conditioning vector 330 may be performed by first neural network 315. The separating of the target source from input audio waveform 305 may be performed by second neural network 335. In some embodiments, second neural network 335 may include a symmetric encoder-decoder U-net neural network with skip-connections. In some embodiments, first neural network 315 includes audio embedding tower 320 to generate the audio embedding, and text embedding tower 325 to generate the textual embedding. In some such embodiments, audio embedding tower 320 may include (a) a modified Resnet-50 architecture (e.g., a variant of Resnet-50 such as Resnetish-50) trained over a plurality of 64-channel log mel spectrograms, and (b) a fully connected final layer with a number of units corresponding to a dimension of the shared representation. In some such embodiments, text embedding tower 325 may include (a) a BERT-base transformer architecture based on CLS-token pooling, and (b) a fully connected final layer to map to the shared representation.

Some embodiments involve determining, by the computing device, a request to separate the target source from input audio waveform 305. Such embodiments also involve sending the request from the computing device to a second computing device, the second computing device comprising a trained version of neural network 300. Such embodiments further involve, after sending the request, the computing device receiving, from the second computing device, the separated audio corresponding to the target source as output by the trained version of neural network 300. Such embodiments additionally involve outputting the separated target source 340.

In some embodiments, the computing device includes an audio input device (e.g., a microphone), and the receiving of input audio waveform 305 involves generating audio content using the audio input device, and receiving, at the computing device, the generated audio content from the audio input device.

Some embodiments involve obtaining a trained version of neural network 300 at the computing device, wherein the providing of the separated target source 340 involves providing by the computing device using trained neural network 300.

Some embodiments involve modifying, based on separated particular audio source 335, one or more audio characteristics of input audio waveform 305.

In some embodiments, the computing device (e.g., a mobile device) can determine a request to identify a target audio source in input audio waveform 305. Then, the computing device (e.g., a mobile device) can send the request to identify the target audio source from the computing device (e.g., a mobile device) to a second computing device (e.g., a cloud server). The second computing device (e.g., a cloud server) can include a trained version of neural network 300. Subsequently, the computing device (e.g., a mobile device) can receive, from the second computing device (e.g., a cloud server), the separated target source 340 as output by the trained version of neural network 300. Then, the computing device (e.g., a mobile device) can output separated target source 340.

In some embodiments, the computing device can separate one or more target audio sources, and modify an audio content corresponding to the one or more target audio sources. For example, the computing device can suppress sounds corresponding to suppressed audio 335A (e.g., a musical instrument, vehicular traffic, and/or other background sounds), and/or enhance sounds corresponding to enhanced audio 335B (e.g., human speech).

An interactive user experience may be provided where a user can adjust an audio content. This provides additional creative flexibility to users to find their own balance between sounds emanating from different audio sources. For example, when an audio captures a conversation at a dinner table, the computing device can filter the audio sources corresponding to human speech at the dinner table, enhancing such sounds, while suppressing background sounds. A user may be presented, via an interactive graphical user interface, with a modified audio content a particular enhanced audio 335B is presented with a selectable icon. A user may indicate selection of enhanced audio 335B, and the computing device may enhance the corresponding audio track, and/or suppress the audio track corresponding to other sounds. Also, for example, aspects of audio enhancement can be applied to existing audio files from a user's library.

Evaluation of Machine Learning Models

Effectiveness of conditioning encoder 106 or joint embedding network 315 (also referred to as SoundWords) may be evaluated for joint embedding purposes. Also, for example, conditioning encoder 106 or joint embedding network 315 may be evaluated for generating conditioning signals for conditional generator 118 or audio separation network 335 (also referred to as SoundFilter). As in traditional audio separation tasks, a default separation evaluation metric, such as SI-SDR, may be used. To evaluate audio conditioning, the target audio clip and the conditioning audio clip may be extracted from non-overlapping crops of the same input example. In some embodiments, three training runs may be performed, and the mean and standard deviation may be provided across these runs.

As an illustrative example, SoundWords may be a weakly supervised joint embedding model, and may be evaluated based on a Clotho based text-to-audio retrieval evaluation. Although the Clotho dataset has been designed for audio captioning research, it may be repurposed for the evaluations described herein. For example, each of the 5225 captions and 1045 audio clips included in the Clotho evaluation set (with each clip being associated with 5 unique captions), may be embedded using the joint embedding model. For each caption, the closest audio clips in the shared embedding space may be retrieved, and "recall at 1" (R@1), the fraction of captions whose associated clips are in the top position, may be measured. The evaluation task may be performed in a zero-shot capacity. For example, training may be performed on a large scale collection of audio-text pair data sources, without using the Clotho training dataset in any capacity. Subsequently, evaluation of the trained model is performed directly on the Clotho evaluation set. Despite a train-test domain shift, an R@1 retrieval performance of 5.3% may be achieved. Such a result lies within the 4.0%-9.6% range reported for other audio separation models that relied on within-domain training on the Clotho dataset and various pre-training strategies.

Effectiveness of conditional generator 118 or audio separation network 335 (also referred to as SoundFilter) may be evaluated, for example, on the Clotho dataset. Evaluation using audio (respectively, text) conditioning on the Clotho dataset indicates that SoundFilter can achieve a mean enhancement SI-SDR of 10.1 (respectively, 9.1), and a mean suppressed SI-SDR of 10.0 (respectively, 9.0). Ablation studies performed on individual components of SoundFilter indicate a high correlation between a SI-SDR of a model's enhancement output (e.g., enhanced output 140 of FIG. 1 or enhanced audio 335B of FIG. 3), and its suppression output (e.g., suppressed output 135 of FIG. 1 or suppressed audio 335A of FIG. 3). These results are illustrated in FIG. 4.

Figure 4:
FIG. 4 is a table illustrating mean scale-invariant signal-to-distortion ratio (SI-SDR) results of ablation experiments, in accordance with example embodiments.

FIG. 4 is a table 400 that illustrates mean SI-SDR results of ablation experiments, in accordance with example embodiments. First column C1 lists various components of SoundFilter. Second column C2 lists results for ablation studies on the Clotho dataset for enhanced output with audio and text conditioning. Third column C3 lists results for ablation studies on the Clotho dataset for suppressed output with audio and text conditioning. Fourth column C4 lists results for ablation studies on the Audiocaps dataset for enhanced output with audio and text conditioning. Fifth column C5 lists results for ablation studies on the Audiocaps dataset for suppressed output with audio and text conditioning. First row R1 lists the type of dataset, whether the output is enhanced or suppressed, and whether the results are for audio or text conditioning. Second Row R2 lists results for SoundFilter. Third row R3 lists results for consistency loss. Fourth row R4 lists results for suppressed audio output. Fifth row R5 lists results for the "no shared embedding" case. The results are based on a training text rate of 0.3, and the values indicate the mean and standard deviation over three runs.

For example, the entry in R2, C2 indicates that when SoundFilter is evaluated on the Clotho dataset for enhanced output, conditioning on audio results in a mean of 10.1 and a standard deviation of 0.1. For the same dataset, conditioning on text results in a mean of 9.1 and a standard deviation of 0.1.

Effectiveness of conditioning based on audio or text may be evaluated. For example, the parameter for training text rate may be varied. Generally, training text rate controls a percentage of training examples that are conditioned with text instead of audio. For example, 0% indicates that SoundFilter is only trained using audio conditioning, and 100% indicates that the model is only trained with text conditioning.

FIGS. 5A-C illustrates SI-SDR in dB measured between the target audio clip and the enhanced output, in accordance with example embodiments. For example, the SI-SDR may be measured (in dB) between the target audio clip and the enhanced output on the Clotho evaluation dataset illustrated in FIG. 5A, Audiocaps evaluation dataset illustrated in FIG. 5B, and Freesound evaluation dataset in FIG. 5C, using either only text conditioning or only audio conditioning at test time. For each bar graph, the horizontal axis indicates a proportion of text conditioning with respect to audio conditioning, ranging from 0% to 100%. The vertical axis represents values for the SI-SDR.

Upon training only on audio conditioning (a 0% training text rate), SoundFilter appears to perform less optimally on text conditioning evaluations. Upon training only on text conditioning (a 100% training text rate), SoundFilter performs worse on audio conditioning evaluations. Generally, experiments indicate that between these boundary behaviors, SoundFilter may perform effectively for a training text rate of around 10%-40%. Experiments also indicate that varying the training text rate between 0% and 90% does not appear to have a significant influence on the performance of the audio conditioned evaluations. Also, for example, experiments indicate that results obtained using audio conditioning at test time typically achieve a higher level of SI-SDR than results obtained using text conditioning.

In some aspects, the results reflect the data that is used. For example, a limited number of initial audio clips with useful labels or captions were modified with different random crops and gains to create many different audio conditioning examples. However, only a single text conditioning example can be used. This may lead to overfitting, especially when the training text rate parameter is high.

Also, for example, the results indicate that by performing evaluations using both audio conditioning and target clips from the same audio clip, the model does not appear to need to generalize as much compared to using text conditioning. For example, text conditioning may be something general such as "engine starting up," while audio conditioning for the same example may likely contain the same engine as the target audio. Accordingly, overfitting may not affect the audio conditioned evaluations as much and may result in higher SI-SDR than for text conditioning. Additionally, the textual descriptions do not typically exhaustively describe the associated audio sample, and may omit some sound sources that may be present in the audio conditioning extracted from the same clip.

Training Machine Learning Models for Generating Inferences/Predictions

Figure 6:
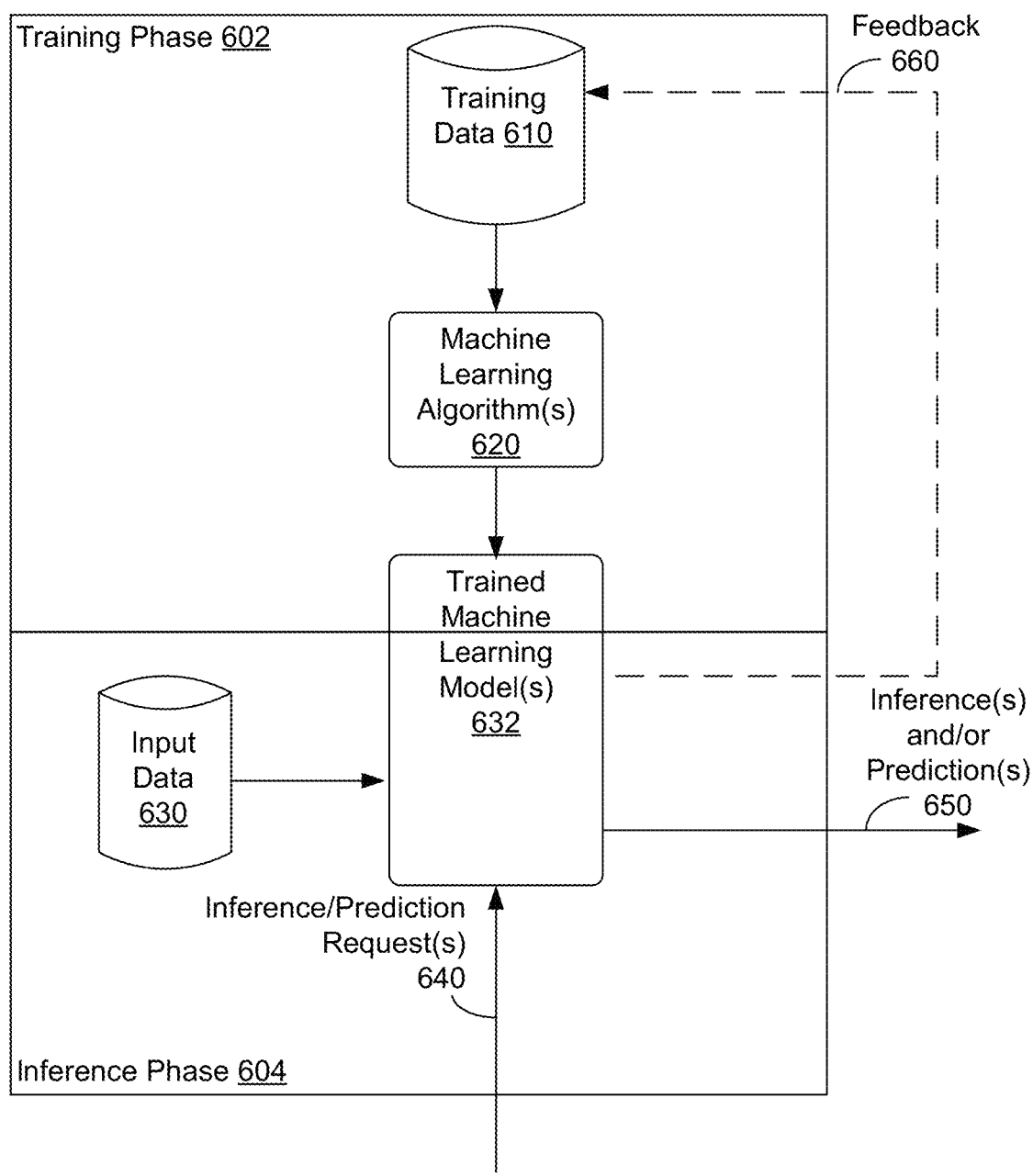
FIG. 6 is a diagram illustrating training and inference phases of a machine learning model, in accordance with example embodiments.

FIG. 6 shows diagram 600 illustrating a training phase 602 (e.g., as illustrated in FIG. 1) and an inference phase 604 (e.g., as illustrated in FIG. 3) of trained machine learning model(s) 632, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 6 shows training phase 602 where one or more machine learning algorithms 620 are being trained on training data 610 to become trained machine learning model 632. Then, during inference phase 604, trained machine learning model 632 can receive input data 630 (e.g., input audio waveform) and one or more inference/prediction requests 640 (perhaps as part of input data 630) and responsively provide as an output one or more inferences and/or predictions 650 (e.g., predict a target audio source).

As such, trained machine learning model(s) 632 can include one or more models of one or more machine learning algorithms 620. Machine learning algorithm(s) 620 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 620 may be supervised or unsupervised, and may implement any suitable combination of online and offline learning.

In some examples, machine learning algorithm(s) 620 and/or trained machine learning model(s) 632 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 620 and/or trained machine learning model(s) 632. In some examples, trained machine learning model(s) 632 can be trained, reside and execute to provide inferences on a particular computing device, and/or otherwise can make inferences for the particular computing device.

During training phase 602, machine learning algorithm(s) 620 can be trained by providing at least training data 610 as training input using unsupervised, supervised, semi-supervised, and/or weakly supervised learning techniques. Unsupervised learning involves providing a portion (or all) of training data 610 to machine learning algorithm(s) 620 and machine learning algorithm(s) 620 determining one or more output inferences based on the provided portion (or all) of training data 610. Supervised learning involves providing a portion of training data 610 to machine learning algorithm(s) 620, with machine learning algorithm(s) 620 determining one or more output inferences based on the provided portion of training data 610, and the output inference(s) are either accepted or corrected based on correct results associated with training data 610. In some examples, supervised learning of machine learning algorithm(s) 620 can be governed by a set of rules and/or a set of labels for the training input, and the set of rules and/or set of labels may be used to correct inferences of machine learning algorithm(s) 620.

Semi-supervised learning involves having correct labels for part, but not all, of training data 610. During semi-supervised learning, supervised learning is used for a portion of training data 610 having correct results, and unsupervised learning is used for a portion of training data 610 not having correct results. In some examples, machine learning algorithm(s) 620 and/or trained machine learning model(s) 632 can be trained using other machine learning techniques, including but not limited to, incremental learning and curriculum learning.

In some examples, machine learning algorithm(s) 620 and/or trained machine learning model(s) 632 can use transfer learning techniques. For example, transfer learning techniques can involve trained machine learning model(s) 632 being pre-trained on one set of data and additionally trained using training data 610. More particularly, machine learning algorithm(s) 620 can be pre-trained on data from one or more computing devices and a resulting trained machine learning model provided to a particular computing device, where the particular computing device is intended to execute the trained machine learning model during inference phase 604. Then, during training phase 602, the pre-trained machine learning model can be additionally trained using training data 610, where training data 610 can be derived from kernel and non-kernel data of the particular computing device. This further training of the machine learning algorithm(s) 620 and/or the pre-trained machine learning model using training data 610 of the particular computing device's data can be performed using either supervised or unsupervised learning. Once machine learning algorithm(s) 620 and/or the pre-trained machine learning model has been trained on at least training data 610, training phase 602 can be completed. The trained resulting machine learning model can be utilized as at least one of trained machine learning model(s) 632.

In particular, once training phase 602 has been completed, trained machine learning model(s) 632 can be provided to a computing device, if not already on the computing device.

Inference phase 604 can begin after trained machine learning model(s) 632 are provided to the particular computing device.

During inference phase 604, trained machine learning model(s) 632 can receive input data 630 and generate and output one or more corresponding inferences and/or predictions 650 about input data 630. As such, input data 630 can be used as an input to trained machine learning model(s) 632 for providing corresponding inference(s) and/or prediction(s) 650 to kernel components and non-kernel components. For example, trained machine learning model(s) 632 can generate inference(s) and/or prediction(s) 650 in response to one or more inference/prediction requests 640. In some examples, trained machine learning model(s) 632 can be executed by a portion of other software. For example, trained machine learning model(s) 632 can be executed by an inference or prediction daemon to be readily available to provide inferences and/or predictions upon request. Input data 630 can include data from the particular computing device executing trained machine learning model(s) 632 and/or input data from one or more computing devices other than the particular computing device.

Input data 630 can include an audio clip or a textual description of an audio provided by one or more sources. The collection of audio clips can include sounds corresponding to various objects.

Inference(s) and/or prediction(s) 650 can include audio and/or text embeddings, predictions, estimated audio sources, and/or other output data produced by trained machine learning model(s) 632 operating on input data 630 (and training data 610). In some examples, trained machine learning model(s) 632 can use output inference(s) and/or prediction(s) 650 as input feedback 660. Trained machine learning model(s) 632 can also rely on past inferences as inputs for generating new inferences.

Neural networks 100, 300, can be examples of machine learning algorithm(s) 620. After training, the trained version of neural networks 100, 300, can be examples of trained machine learning model(s) 632. In this approach, an example of inference/prediction request(s) 640 can be a request to predict a target audio source in a single channel audio waveform, and a corresponding example of inferences and/or prediction(s) 650 can be an output indicating the target audio source, and/or audio sources separate from the target audio source. In some examples, a given computing device can include the trained neural network 300, perhaps after training neural network 100. Then, the given computing device can receive requests to predict a target audio source, and use the trained neural network to generate a prediction of the target audio source.

In some examples, two or more computing devices can be used to provide the target audio source; e.g., a first computing device can generate and send requests to predict the target audio source to a second computing device. Then, the second computing device can use the trained versions of neural networks, perhaps after training, to generate a prediction of the target audio source, and respond to the requests from the first computing device for the prediction of the target audio source, upon reception of responses to the requests, the first computing device can provide the requested output (e.g., using a user interface and/or a display, a printed copy, an electronic communication, etc.).

Example Data Network

Figure 7:
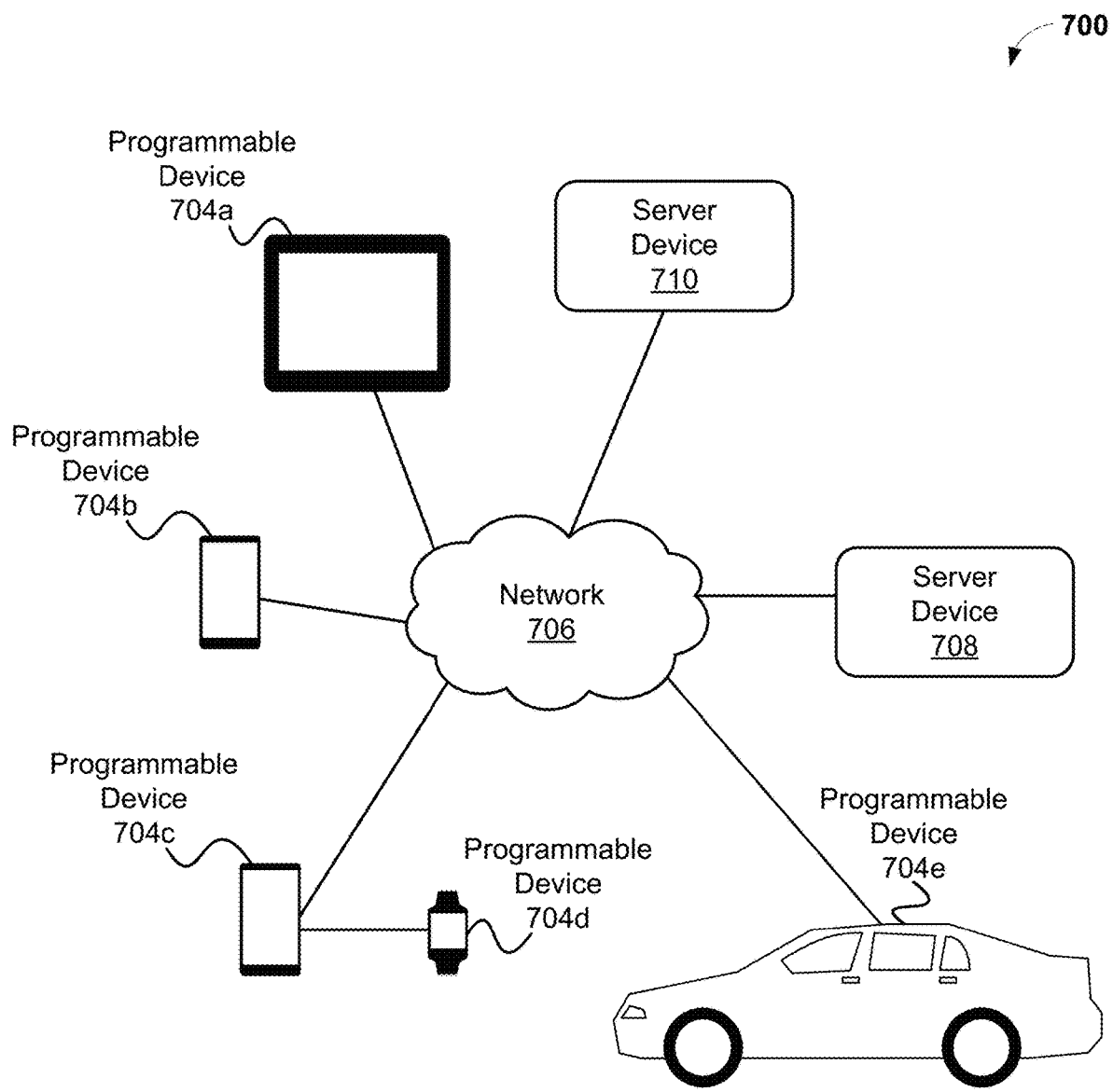
FIG. 7 depicts a distributed computing architecture, in accordance with example embodiments.

FIG. 7 depicts a distributed computing architecture 700, in accordance with example embodiments. Distributed computing architecture 700 includes server devices 708, 710 that are configured to communicate, via network 706, with programmable devices 704a, 704b, 704c, 704d, 704e. Network 706 may correspond to a local area network (LAN), a wide area network (WAN), a WLAN, a WWAN, a corporate intranet, the public Internet, or any other type of network configured to provide a communications path between networked computing devices. Network 706 may also correspond to a combination of one or more LANs, WANs, corporate intranets, and/or the public Internet.

Although FIG. 7 only shows five programmable devices, distributed application architectures may serve tens, hundreds, or thousands of programmable devices. Moreover, programmable devices 704a, 704b, 704c, 704d, 704e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 704a, 704b, 704c, 704e, programmable devices can be directly connected to network 706. In other examples, such as illustrated by programmable device 704d, programmable devices can be indirectly connected to network 706 via an associated computing device, such as programmable device 704c. In this example, programmable device 704c can act as an associated computing device to pass electronic communications between programmable device 704d and network 706. In other examples, such as illustrated by programmable device 704e, a computing device can be part of and/or inside a vehicle, such as a car, a truck, a bus, a boat or ship, an airplane, etc. In other examples not shown in FIG. 7, a programmable device can be both directly and indirectly connected to network 706.

Server devices 708, 710 can be configured to perform one or more services, as requested by programmable devices 704a-704e. For example, server device 708 and/or 710 can provide content to programmable devices 704a-704e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 708 and/or 710 can provide programmable devices 704a-704e with access to software for database, search, computation, graphical, audio, video, World Wide Web/Internet utilization, and/or other functions. Many other examples of server devices are possible as well.

Computing Device Architecture

Figure 8:
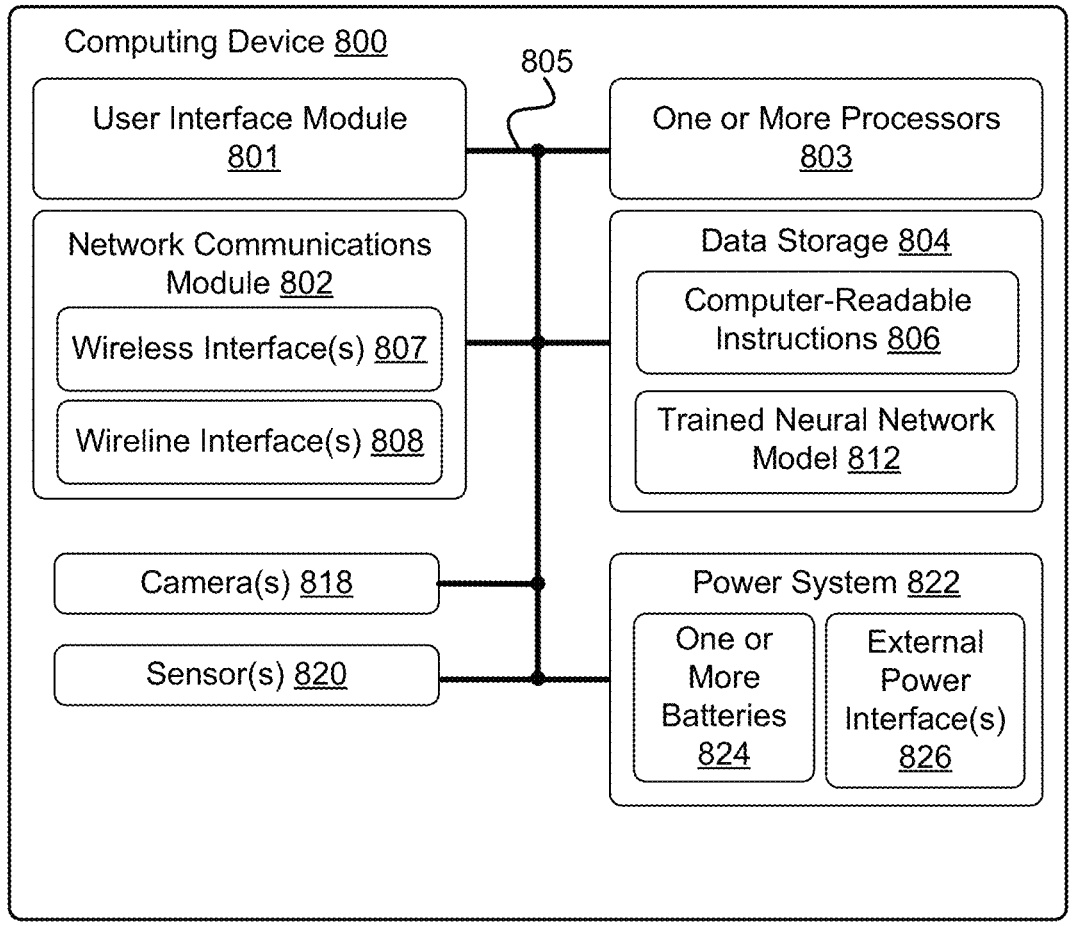
FIG. 8 is a block diagram of a computing device, in accordance with example embodiments.

FIG. 8 is a block diagram of an example computing device 800, in accordance with example embodiments. In particular, computing device 800 shown in FIG. 8 can be configured to perform at least one function of and/or related to neural networks 200, 300, and/or method 800.

Computing device 800 may include a user interface module 801, a network communications module 802, one or more processors 803, data storage 804, one or more cameras 818, one or more sensors 820, and power system 822, all of which may be linked together via a system bus, network, or other connection mechanism 805.

User interface module 801 can be operable to send data to and/or receive data from external user input/output devices. For example, user interface module 801 can be configured to send and/or receive data to and/or from user input devices such as a touch screen, a computer mouse, a keyboard, a keypad, a touch pad, a trackball, a joystick, a voice recognition module, and/or other similar devices. User interface module 801 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 801 can also be configured to generate audible outputs, with devices such as a speaker, speaker jack, audio output port, audio output device, earphones, and/or other similar devices. User interface module 801 can further be configured with one or more haptic devices that can generate haptic outputs, such as vibrations and/or other outputs detectable by touch and/or physical contact with computing device 800. In some examples, user interface module 801 can be used to provide a graphical user interface (GUI) for utilizing computing device 800. For example, user interface module 801 can be used to provide selectable audio tracks, where the selectable audio tracks are separated from an input audio waveform. Also, for example, user interface module 801 can be used to receive user selection of an audio track. In some embodiments, the selected audio track can be enhanced, and/or suppressed.

Network communications module 802 can include one or more devices that provide one or more wireless interfaces 807 and/or one or more wireline interfaces 808 that are configurable to communicate via a network. Wireless interface(s) 807 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 808 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 802 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 803 can include one or more general purpose processors, and/or one or more special purpose processors (e.g., digital signal processors, tensor processing units (TPUs), graphics processing units (GPUs), application specific integrated circuits, etc.). One or more processors 803 can be configured to execute computer-readable instructions 806 that are contained in data storage 804 and/or other instructions as described herein.

Data storage 804 can include one or more non-transitory computer-readable storage media that can be read and/or accessed by at least one of one or more processors 803. The one or more computer-readable storage media can include volatile and/or non-volatile storage components, such as optical, magnetic, organic or other memory or disc storage, which can be integrated in whole or in part with at least one of one or more processors 803. In some examples, data storage 804 can be implemented using a single physical device (e.g., one optical, magnetic, organic or other memory or disc storage unit), while in other examples, data storage 804 can be implemented using two or more physical devices.

Data storage 804 can include computer-readable instructions 806 and perhaps additional data. In some examples, data storage 804 can include storage required to perform at least part of the herein-described methods, scenarios, and techniques and/or at least part of the functionality of the herein-described devices and networks. In some examples, data storage 804 can include storage for a trained neural network model 812 (e.g., a model of trained neural networks such as neural network 200). In particular of these examples, computer-readable instructions 806 can include instructions that, when executed by processor(s) 803, enable computing device 800 to provide for some or all of the functionality of trained neural network model 812.

In some examples, computing device 800 can include one or more cameras 818. Camera(s) 818 can include one or more image capture devices, such as still and/or video cameras, equipped to capture videos. The one or more images can be one or more images utilized in video imagery. Camera(s) 818 can capture light and/or electromagnetic radiation emitted as visible light, infrared radiation, ultraviolet light, and/or as one or more other frequencies of light.

In some examples, computing device 800 can include one or more sensors 820. Sensors 820 can be configured to measure conditions within computing device 800 and/or conditions in an environment of computing device 800 and provide data about these conditions. For example, sensors 820 can include one or more of: (i) sensors for obtaining data about computing device 800, such as, but not limited to, a thermometer for measuring a temperature of computing device 800, a battery sensor for measuring power of one or more batteries of power system 822, and/or other sensors measuring conditions of computing device 800; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 800, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 800, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 800, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 820 are possible as well.

Power system 822 can include one or more batteries 824 and/or one or more external power interfaces 826 for providing electrical power to computing device 800. Each battery of the one or more batteries 824 can, when electrically coupled to the computing device 800, act as a source of stored electrical power for computing device 800. One or more batteries 824 of power system 822 can be configured to be portable. Some or all of one or more batteries 824 can be readily removable from computing device 800. In other examples, some or all of one or more batteries 824 can be internal to computing device 800, and so may not be readily removable from computing device 800. Some or all of one or more batteries 824 can be rechargeable. For example, a rechargeable battery can be recharged via a wired connection between the battery and another power supply, such as by one or more power supplies that are external to computing device 800 and connected to computing device 800 via the one or more external power interfaces. In other examples, some or all of one or more batteries 824 can be non-rechargeable batteries.

One or more external power interfaces 826 of power system 822 can include one or more wired-power interfaces, such as a USB cable and/or a power cord, that enable wired electrical power connections to one or more power supplies that are external to computing device 800. One or more external power interfaces 826 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 826, computing device 800 can draw electrical power from the external power source the established electrical power connection. In some examples, power system 822 can include related sensors, such as battery sensors associated with the one or more batteries or other types of electrical power sensors.

Cloud-Based Servers

Figure 9:
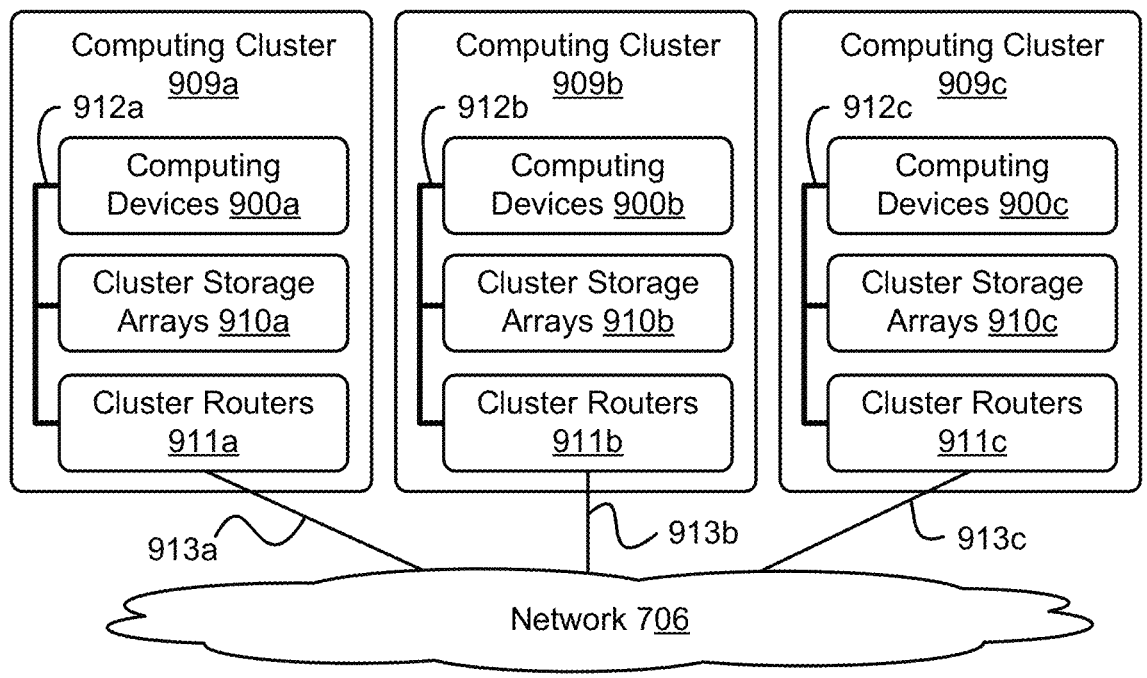
FIG. 9 depicts a network of computing clusters arranged as a cloud-based server system, in accordance with example embodiments.

FIG. 9 depicts a network 706 of computing clusters 909a, 909b, 909c arranged as a cloud-based server system in accordance with an example embodiment. Computing clusters 909a, 909b, 909c can be cloud-based devices that store program logic and/or data of cloud-based applications and/or services; e.g., perform at least one function of and/or related to neural networks 200, 300, and/or methods 1000, 1100.

In some embodiments, computing clusters 909a, 909b, 909c can be a single computing device residing in a single computing center. In other embodiments, computing clusters 909a, 909b, 909c can include multiple computing devices in a single computing center, or even multiple computing devices located in multiple computing centers located in diverse geographic locations. For example, FIG. 9 depicts each of computing clusters 909a, 909b, and 909c residing in different physical locations.

In some embodiments, data and services at computing clusters 909a, 909b, 909c can be encoded as computer readable information stored in non-transitory, tangible computer readable media (or computer readable storage media) and accessible by other computing devices. In some embodiments, computing clusters 909a, 909b, 909c can be stored on a single disk drive or other tangible storage media, or can be implemented on multiple disk drives or other tangible storage media located at one or more diverse geographic locations.

FIG. 9 depicts a cloud-based server system in accordance with an example embodiment. In FIG. 9, functionality of neural networks 200, 300, and/or a computing device can be distributed among computing clusters 909a, 909b, 909c. Computing cluster 909a can include one or more computing devices 900a, cluster storage arrays 910a, and cluster routers 911a connected by a local cluster network 912a. Similarly, computing cluster 909b can include one or more computing devices 900b, cluster storage arrays 910b, and cluster routers 911b connected by a local cluster network 912b. Likewise, computing cluster 909c can include one or more computing devices 900c, cluster storage arrays 910c, and cluster routers 911c connected by a local cluster network 912c.

In some embodiments, each of computing clusters 909a, 909b, and 909c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909a, for example, computing devices 900a can be configured to perform various computing tasks of a neural network, a text embedding tower, an audio embedding tower, a joint embedding network, an audio separation network, and/or a computing device. In one embodiment, the various functionalities of a neural network, a text embedding tower, an audio embedding tower, a joint embedding network, an audio separation network, and/or a computing device can be distributed among one or more of computing devices 900a, 900b, 900c. Computing devices 900b and 900c in respective computing clusters 909b and 909c can be configured similarly to computing devices 900a in computing cluster 909a. On the other hand, in some embodiments, computing devices 900a, 900b, and 900c can be configured to perform different functions.

In some embodiments, computing tasks and stored data associated with a neural network, a text embedding tower, an audio embedding tower, a joint embedding network, an audio separation network, and/or a computing device can be distributed across computing devices 900a, 900b, and 900c based at least in part on the processing requirements of a neural network, a text embedding tower, an audio embedding tower, a joint embedding network, an audio separation network, and/or a computing device, the processing capabilities of computing devices 900a, 900b, 900c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 910a, 910b, 910c of computing clusters 909a, 909b, 909c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a neural network, a text embedding tower, an audio embedding tower, a joint embedding network, an audio separation network, and/or a computing device can be distributed across computing devices 900a, 900b, 900c of computing clusters 909a, 909b, 909c, various active portions and/or backup portions of these components can be distributed across cluster storage arrays 910a, 910b, 910c. For example, some cluster storage arrays can be configured to store one portion of the data of a neural network, a text embedding tower, an audio embedding tower, a joint embedding network, an audio separation network, and/or a computing device, while other cluster storage arrays can store other portion(s) of data of a neural network, a text embedding tower, an audio embedding tower, a joint embedding network, an audio separation network, and/or a computing device. Also, for example, some cluster storage arrays can be configured to store the data of a first neural network, while other cluster storage arrays can store the data of a second and/or third neural network. Additionally, some cluster storage arrays can be configured to store backup versions of data stored in other cluster storage arrays.

Cluster routers 911a, 911b, 911c in computing clusters 909a, 909b, 909c can include networking equipment configured to provide internal and external communications for the computing clusters. For example, cluster routers 911a in computing cluster 909a can include one or more internet switching and routing devices configured to provide (i) local area network communications between computing devices 900a and cluster storage arrays 910a via local cluster network 912a, and (ii) wide area network communications between computing cluster 909a and computing clusters 909b and 909c via wide area network link 913a to network 706. Cluster routers 911b and 911c can include network equipment similar to cluster routers 911a, and cluster routers 911b and 911c can perform similar networking functions for computing clusters 909b and 909b that cluster routers 911a perform for computing cluster 909a.

In some embodiments, the configuration of cluster routers 911a, 911b, 911c can be based at least in part on the data communication requirements of the computing devices and cluster storage arrays, the data communications capabilities of the network equipment in cluster routers 911a, 911b, 911c, the latency and throughput of local cluster networks 912a, 912b, 912c, the latency, throughput, and cost of wide area network links 913a, 913b, 913c, and/or other factors that can contribute to the cost, speed, fault-tolerance, resiliency, efficiency and/or other design criteria of the moderation system architecture.

Example Methods of Operation

FIG. 10 is a flowchart of a method 1000, in accordance with example embodiments. Method 1000 can be executed by a computing device, such as computing device 800. Method 1000 can begin at block 1010, where the computing device can receive training data comprising a plurality of audio clips and a plurality of textual descriptions of audio.

At block 1020, the computing device can generate a shared representation comprising a joint embedding (e.g., by conditioning encoder 106 of FIG. 1), wherein an audio embedding of a given audio clip of the plurality of audio clips is within a threshold distance of a text embedding of a textual description of the given audio clip.

At block 1030, the computing device can generate, based on the joint embedding, a conditioning vector (e.g., by conditioning vector 116 of FIG. 1).

At block 1040, the computing device can train, based on the conditioning vector, a neural network (e.g., by conditional generator 118 of FIG. 1) to: receive (i) an input audio waveform, and (ii) an input comprising one or more of an input textual description of a target audio source in the input audio waveform, or an audio sample of the target audio source, separate audio corresponding to the target audio source from the input audio waveform, and output the separated audio corresponding to the target audio source in response to the receiving of the input.

In some embodiments, the neural network includes a symmetric encoder-decoder U-net neural network with skip-connections.

In some embodiments, the training of the neural network includes selecting the conditioning vector to be a first conditioning vector corresponding to a textual description or a second conditioning vector corresponding to an audio sample, wherein the selecting is based on a training text rate parameter indicative of a relative proportion of the first conditioning vector to the second conditioning vector.

In some embodiments, the generating of the shared representation includes training a second neural network to generate the shared representation, and generating the conditioning vector from the shared representation.

In some embodiments, the second neural network includes an audio embedding tower to generate the audio embedding, and a text embedding tower to generate the textual embedding. In some embodiments, the audio embedding tower includes (a) a modified Resnet-architecture trained over a plurality of 64-channel log mel spectrograms, and (b) a fully connected final layer with a number of units corresponding to a dimension of the shared representation. In some embodiments, the text embedding tower includes (a) a BERT-base transformer architecture based on CLS-token pooling, and (b) a fully connected final layer to map to the shared representation.

Some embodiments involve receiving, by the computing device, third training data comprising a second plurality of audio clips comprising one or more background sounds. Such embodiments also involve mixing the plurality of audio clips in the plurality of pairs and the one or more background sounds to generate a third plurality of audio clips. The training of the neural network may be based on the third plurality of audio clips. In some of these embodiments, the second plurality of audio clips comprising the one or more background sounds are synthetically generated. In some of these embodiments, the training of the neural network includes training the neural network to generate, from the input audio waveform, a first audio described by the conditioning vector, and generate, from the input audio waveform, a second audio comprising the one or more background sounds not described by the conditioning vector.

Such embodiments also involve determining a reconstruction loss between the second audio and the third plurality of audio clips, wherein the training of the neural network is based on the reconstruction loss. Such embodiments also involve determining a consistency loss between the first audio, the second audio, and the third plurality of audio clips, wherein the training of the neural network is based on the consistency loss. Such embodiments also involve determining a reconstruction loss between the first audio and the plurality of audio clips, wherein the training of the neural network is based on the reconstruction loss.

In some embodiments, the training of the neural network may be performed at the computing device.

FIG. 11 is a flowchart of a method 1100, in accordance with example embodiments. Method 1100 can be executed by a computing device, such as computing device 800. Method 1100 can begin at block 1110, where the computing device can receive an input audio waveform (e.g., input audio waveform 305 of FIG. 3) comprising one or more sources of audio.

At block 1120, the computing device can receive one or more of an input textual description of a target source of the one or more sources, or an audio sample of the target source (e.g., input 310 of FIG. 3).

At block 1130, the computing device can generate, by a neural network (e.g., neural network 300), a representation of the one or more of the input textual description of the target source, or the audio sample of the target source into a joint embedding, wherein an audio embedding of an audio clip is within a threshold distance of a text embedding of a textual description of the audio clip.

At block 1140, the computing device can generate, based on the representation and by the neural network (e.g., neural network 300), a conditioning vector (e.g., conditioning vector 330 of FIG. 3).

At block 1150, the computing device can separate, by the neural network (e.g., neural network 300) and based on the conditioning vector, audio corresponding to the target source (e.g., separated target source 340 of FIG. 3) from the input audio waveform.

At block 1160, the computing device can provide the separated audio corresponding to the target source as output by the neural network.

In some embodiments, the neural network may include a first neural network and a second neural network. The generating of the representation may be performed by the first neural network. The generating of the conditioning vector may be performed by the first neural network. The separating of the audio corresponding to the target source from the input audio waveform may be performed by the second neural network. In some embodiments, the first neural network may include a symmetric encoder-decoder U-net neural network with skip-connections. In some embodiments, the second neural network comprises an audio embedding tower to generate the audio embedding, and a text embedding tower to generate the textual embedding. In some such embodiments, the audio embedding tower may include (a) a modified Resnet-50 architecture trained over a plurality of 64-channel log mel spectrograms, and (b) a fully connected final layer with a number of units corresponding to a dimension of the shared representation. In some such embodiments, the text embedding tower may include (a) a BERT-base transformer architecture based on CLS-token pooling, and (b) a fully connected final layer to map to the shared representation.

Some embodiments involve determining, by the computing device, a request to separate audio corresponding to the target audio source from the input audio waveform. Such embodiments also involve sending the request from the computing device to a second computing device, the second computing device comprising a trained version of the neural network. Such embodiments further involve, after sending the request, the computing device receiving, from the second computing device, the separated audio corresponding to the target source as output by the trained version of the neural network. Such embodiments additionally involve outputting the separated target source.

In some embodiments, the computing device includes an audio input device, and the receiving of the input audio waveform involves generating audio content using the audio input device, and receiving, at the computing device, the generated audio content from the audio input device.

Some embodiments involve obtaining a trained neural network at the computing device, and wherein the providing of the separated target source involves providing, by the computing device, the separated target source using the trained neural network.

Some embodiments involve modifying, based on the separated particular audio source, one or more audio characteristics of the input audio waveform.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:
receiving, by a computing device, training data comprising a plurality of audio clips and a plurality of textual descriptions of audio;
generating, by a conditioning encoder, a shared representation comprising a joint embedding, wherein an audio embedding of a given audio clip of the plurality of audio clips is configured by the conditioning encoder to be within a threshold distance of a text embedding of a textual description of the given audio clip;
generating, based on the joint embedding, (a) a first conditioning vector corresponding to a textual description by embedding the textual description in the shared representation, or (b) a second conditioning vector corresponding to an audio sample by embedding the audio sample in the shared representation;
training, based on a selection of the first conditioning vector or the second conditioning vector, a first neural network to:
receive (i) an input audio waveform, and (ii) an input comprising one or more of an input textual description of a target audio source in the input audio waveform or the audio sample of the target audio source,
separate audio corresponding to the target audio source from the input audio waveform, and
output the separated audio corresponding to the target audio source in response to the receiving of the input, and
wherein the selection of the first conditioning vector or the second conditioning vector is performed automatically during the training; and
providing the trained first neural network to separate audio corresponding to a target source from another input audio waveform.

2. The computer-implemented method of claim 1, wherein the first neural network comprises a symmetric encoder-decoder U-net neural network with skip-connections.

3. The computer-implemented method of claim 1, wherein the selection of the first conditioning vector or the second conditioning vector by the first neural network is based on a training text rate parameter indicative of a relative proportion of the first conditioning vector to the second conditioning vector.

4. The computer-implemented method of claim 1, wherein the generating of the shared representation further comprises training a second neural network to:
generate the joint embedding; and
generate the first or second conditioning vector from the joint embedding, wherein the training of the second neural network is based on second training data comprising a plurality of pairs, each pair comprising an audio clip and a textual description of the audio clip.

5. The computer-implemented method of claim 4, wherein the second neural network comprises an audio embedding tower to generate the audio embedding, and a text embedding tower to generate the text embedding.

6. The computer-implemented method of claim 5, wherein the audio embedding tower comprises (a) a modified Resnet-50 architecture trained over a plurality of 64-channel log mel spectrograms, and (b) a fully connected final layer with a number of units corresponding to a dimension of the shared representation.

7. The computer-implemented method of claim 5, wherein the text embedding tower comprises (a) a Bidirectional Encoder Representations from Transformers (BERT)-base transformer architecture based on special classification token (CLS-token) pooling, and (b) a fully connected final layer to map to the shared representation.

8. The computer-implemented method of claim 4, further comprising:
receiving, by the computing device, third training data comprising a plurality of audio clips of one or more background sounds;
mixing the plurality of audio clips in the training data and the plurality of audio clips of one or more background sounds, to generate a plurality of mixed audio clips, and
wherein the training of the first neural network is based on the plurality of mixed audio clips.

9. The computer-implemented method of claim 8, wherein the plurality of audio clips of one or more background sounds are synthetically generated.

10. The computer-implemented method of claim 8, wherein the training of the first neural network comprises training the first neural network to:
separate, from the input audio waveform, a first audio output described by the first or second conditioning vector; and
separate, from the input audio waveform, a second audio output comprising the one or more background sounds not described by the first or second conditioning vector.

11. The computer-implemented method of claim 10, further comprising:
determining a reconstruction loss between the second audio output and the plurality of audio clips of one or more background sounds, and
wherein the training of the first neural network is based on the reconstruction loss.

12. The computer-implemented method of claim 10, further comprising:
determining a consistency loss between the first audio output, the second audio output, and the plurality of mixed audio clips, and
wherein the training of the first neural network is based on the consistency loss.

13. The computer-implemented method of claim 10, further comprising:
determining a reconstruction loss between the first audio output and the plurality of audio clips, and
wherein the training of the first neural network is based on the reconstruction loss.

14. The computer-implemented method of claim 4, wherein the first neural network and the second neural network are trained separately.

15. The computer-implemented method of claim 1, wherein the selection of the first conditioning vector or the second conditioning vector during the training is performed randomly.

16. The computer-implemented method of claim 1, wherein the selection of the first conditioning vector or the second conditioning vector during the training is performed by the neural network.

17. A computer-implemented method, comprising:
receiving, by a computing device, an input audio waveform comprising one or more sources of audio;
receiving, by the computing device, one or more of an input textual description of a target source of the one or more sources, or an audio sample of the target source;
generating, by a conditioning encoder of a neural network, a representation of the one or more of the input textual description of the target source, or the audio sample of the target source into a joint embedding, wherein an audio embedding of an audio clip is configured by the conditioning encoder to be within a threshold distance of a text embedding of a textual description of the audio clip;
generating, based on the representation and by the conditioning encoder, (a) a first conditioning vector corresponding to the input textual description of the target source by embedding the input textual description in the representation, or (b) a second conditioning vector corresponding to the audio sample of the target source by embedding the audio sample in the representation;
separating, by the neural network and based on the first or second conditioning vector, audio corresponding to the target source from the input audio waveform; and
providing, by the computing device, the separated audio corresponding to the target source as output by the neural network, and
the neural network having been trained based on a selection of a text-based conditioning vector or an audio-based conditioning vector, the selection of the text-based conditioning vector or the audio-based conditioning vector having been performed automatically during the training.

18. The computer-implemented method of claim 17, wherein the neural network comprises a first neural network and a second neural network, and
wherein the generating of the representation is performed by the first neural network,
wherein the generating of the conditioning vector is performed by the first neural network, and
wherein the separating of the audio corresponding to the target source from the input audio waveform is performed by the second neural network.

19. The computer-implemented method of claim 18, wherein the first neural network comprises a symmetric encoder-decoder U-net neural network with skip-connections.

20. The computer-implemented method of claim 18, wherein the second neural network comprises an audio embedding tower to generate the audio embedding, and a text embedding tower to generate the text embedding.

21. The computer-implemented method of claim 20, wherein the audio embedding tower comprises (a) a modified Resnet-50 architecture trained over a plurality of 64-channel log mel spectrograms, and (b) a fully connected final layer with a number of units corresponding to a dimension of the representation.

22. The computer-implemented method of claim 18, wherein the text embedding tower comprises (a) a BERT-base transformer architecture based on CLS-token pooling, and (b) a fully connected final layer to map to the representation.

23. A computing device, comprising:
one or more processors; and
data storage, wherein the data storage has stored thereon computer-executable instructions that, when executed by the one or more processors, cause the computing device to carry out operations comprising:
receiving training data comprising a plurality of audio clips and a plurality of textual descriptions of audio;
generating, by a conditioning encoder, a shared representation comprising a joint embedding, wherein an audio embedding of a given audio clip of the plurality of audio clips is configured by the conditioning encoder to be within a threshold distance of a text embedding of a textual description of the given audio clip;
generating, based on the joint embedding, (a) a first conditioning vector corresponding to a textual description by embedding the textual description in the shared representation, or (b) a second conditioning vector corresponding to an audio sample by embedding the audio sample in the shared representation;
training, based on a selection of the first conditioning vector or the second conditioning vector, a neural network to:
receive (i) an input audio waveform, and (ii) an input comprising one or more of an input textual description of a target audio source in the input audio waveform, or the audio sample of the target audio source,
separate audio corresponding to the target audio source from the input audio waveform, and
output the separated audio corresponding to the target audio source in response to the receiving of the input, and
wherein the selection of the first conditioning vector or the second conditioning vector is performed automatically during the training; and
providing the trained neural network to separate audio corresponding to a target source from another input audio waveform.

* * * * *